(12) United States Patent
Tissot et al.

(10) Patent No.: US 10,441,940 B2
(45) Date of Patent: Oct. 15, 2019

(54) POLYMERS GRAFTED WITH ORGANIC PHOSPHOROUS COMPOUNDS FOR EXTRACTING URANIUM FROM SOLUTIONS

(71) Applicants: UNIVERSITY OF MARYLAND, College Park, MD (US); THE CATHOLIC UNIVERSITY OF AMERICA, Washington, DC (US)

(72) Inventors: Chanel Tissot, Hyattsville, MD (US); Aaron Barkatt, Silver Spring, MD (US); Mohamad I. Al-Sheikhly, Potomac, MD (US)

(73) Assignees: UNIVERSITY OF MARYLAND, College Park, College Park, MD (US); CATHOLIC UNIVERSITY OF AMERICA, Washington, DC (US)

( * ) Notice: Subject to any disclaimer, the term of this patent is extended or adjusted under 35 U.S.C. 154(b) by 451 days.

(21) Appl. No.: 14/412,892

(22) PCT Filed: Aug. 20, 2013

(86) PCT No.: PCT/US2013/055885
§ 371 (c)(1),
(2) Date: Jan. 5, 2015

(87) PCT Pub. No.: WO2014/031702
PCT Pub. Date: Feb. 27, 2014

(65) Prior Publication Data
US 2015/0190783 A1    Jul. 9, 2015

Related U.S. Application Data

(60) Provisional application No. 61/691,115, filed on Aug. 20, 2012.

(51) Int. Cl.
*B01J 20/00* (2006.01)
*B01J 20/30* (2006.01)
(Continued)

(52) U.S. Cl.
CPC ......... *B01J 20/3085* (2013.01); *B01J 20/264* (2013.01); *B01J 20/265* (2013.01);
(Continued)

(58) Field of Classification Search
None
See application file for complete search history.

(56) References Cited

U.S. PATENT DOCUMENTS 3,297,786 A * 1/1967 Horowitz ............. D06M 14/00
525/426
3,644,582 A * 2/1972 Knaack ................. C08F 255/00
525/264

(Continued)

FOREIGN PATENT DOCUMENTS

DE    3241497 A1    5/1984
FR    2911883 A1    8/2008
GB    16023341 A    11/1981

OTHER PUBLICATIONS

PCT International Report on Patentability and Written Opinion of the International Searching Authority for PCT/US2013/055885 dated Feb. 24, 2015.
(Continued)

*Primary Examiner* — Chester T Barry
(74) *Attorney, Agent, or Firm* — Carter, DeLuca & Farrell LLP; George Likourezos

(57) ABSTRACT

Complexing or chelating agents that offer strong, selective bonding with uranium as well as a broad pH range of effectiveness, specifically including the pH range around 8.2, together with the acrylic double bonds required for
(Continued)

radiation-induced grafting on polymers to remove uranium from a solution such as seawater. The novel adsorbing species are phosphorus-containing molecules, in particular organic phosphates, phosphonates and phosphoric acids. Organic phosphorus compounds, for example, organic phosphates, phosphonates, and phosphoric acids, are attached to polymer fibers to form fibers, fiber fabrics or membranes that are effective, or show activity, in uranium adsorption.

60 Claims, 14 Drawing Sheets

(51) Int. Cl.
| | |
|---|---|
| G21F 9/12 | (2006.01) |
| C22B 60/02 | (2006.01) |
| B01J 20/26 | (2006.01) |
| B01J 20/32 | (2006.01) |
| B01J 20/34 | (2006.01) |
| B01J 20/28 | (2006.01) |
| C02F 1/28 | (2006.01) |
| C08G 69/00 | (2006.01) |
| C02F 101/00 | (2006.01) |
| C02F 1/68 | (2006.01) |
| C02F 103/08 | (2006.01) |

(52) U.S. Cl.
CPC ..... *B01J 20/2804* (2013.01); *B01J 20/28023* (2013.01); *B01J 20/28038* (2013.01); *B01J 20/321* (2013.01); *B01J 20/3212* (2013.01); *B01J 20/3278* (2013.01); *B01J 20/3425* (2013.01); *B01J 20/3475* (2013.01); *C02F 1/285* (2013.01); *C08G 69/00* (2013.01); *C22B 60/0265* (2013.01); *G21F 9/12* (2013.01); *C02F 1/683* (2013.01); *C02F 2101/006* (2013.01); *C02F 2103/08* (2013.01); *C02F 2303/16* (2013.01)

(56) References Cited

U.S. PATENT DOCUMENTS

| | | | | |
|---|---|---|---|---|
| 3,970,534 | A * | 7/1976 | Fujiwara | C08F 8/00 521/32 |
| 5,256,298 | A | 10/1993 | Powell | |
| 5,707,528 | A * | 1/1998 | Berry | C02F 1/285 210/192 |
| 6,290,637 | B1 | 9/2001 | Eighmy | |
| 2005/0147824 | A1* | 7/2005 | Myers | B05D 7/02 428/411.1 |
| 2009/0311540 | A1* | 12/2009 | Cohen | B05D 1/18 428/447 |
| 2012/0202017 | A1* | 8/2012 | Nealey | B81C 1/00031 428/195.1 |
| 2013/0133980 | A1 | 5/2013 | Pourdeyhimi et al. | |

OTHER PUBLICATIONS

PCT International Search Report for PCT/US2013/055885 dated Nov. 7, 2013.

Seko et al., Current Status of Adsorbent for Metal Ions with Radiation Grafting and Crosslinking Techniques, Nuclear Instruments and Methods in Physics Research B, 236, 21-29 (2005).
Saito et al., Recovery of Uranium from Seawater Using Amidoxime Hollow Fibers, AIChE Journal, 34, 411-416 (1988).
Seko et al., Aquaculture of Uranium in Seawater by a Fabric-Adsorbent Submerged System, Nuclear Technology, 144, 274-278 (2003).
Seko et al., Rapid Removal of Arsenic(V) by Zirconium(IV) Loaded Phosphoric Chelate Adsorbent Synthesized by Radiation Induced Graft Polymerization, Reactive and Functional Polymers, 59, 235-241 (2004).
Basuki et al, Direct Synthesis of Adsorbent Having Phosphoric Acid with Radiation Induced Graftpolymerization, Journal of Ion Exchange, 14 supplement, 209-212 (2003).
Takeda et al., Adsorption and elution in hollow-fiber-packed bed for recovery of uranium from seawater, Industrial and Engineering Chemistry Research, 30, 185-190 (1991).
Das et al., Exchanges of uranium(VI) species in N-[2-(diethoxyphosphoryl)-ethyl]-functionalized sorbents, Journal of Physical Chemistry B, 113, 6328-6335 (2009).
Hazer et al., Synthesis of a novel chelating resin for the separation and preconcentration of uranium(VI) and its spectrophotometric determination, Analytical Sciences, 25, 547-551 (2009).
Suzuki et al., Fractional elution and determination of uranium and vanadium adsorbed on N[2-(diethoxyphosphoryl)-ethyl] fiber from seawater, Analytical Sciences, 16, 429-432 (2000).
Tamada, Current status of technology for collection of uranium from seawater, Erice Seminar, Aug. 2009.
Unsworth et al., "Determination of uranium and thorium in natural waters with a high matrix concentration using solid-phase extraction inductively coupled plasma mass spectrometry", Analytica Chimica Acta 442, pp. 141-146 (2001).
Dietz et al., "An improved extraction chromatographic resin for the separation of uranium from acidic nitrate media", ScienceDirect, vol. 54, Issue 6, pp. 1173-1184 (Jul. 2001).
Carter et al., "Determination of uranium and thorium in geological materials using extraction chromatography", The Anaylst, 124, pp. 271-274 (1999).
Warwick et al., "An optimised and robust method for the determination of uranium and plutonium in aqueous samples", Applied Radiation and Isotopes, 50, pp. 579-583 (1999).
Jia et al., "Determination of uranium isotopes in environmental samples by alpha-spectrometry", Journal of Radioanalytical and Nuclear Chemistry, vol. 253, No. 3, pp. 395-406 (2002).
Benkhedda et al., "Flow-injection technique for determination of uranium and thorium isotopes in urine by inductively coupled plasma mass spectrometry", Anal Bioanal Chem, 381, pp. 1596-1603 (2005).
Becotte-Haigh et al., "Flow injection manifold for matrix removal in inductively coupled plasma mass spectrometry by solid phase extraction: determination of Al, Be, Li and Mg in a uranium matrix", Journal of Analytical Atomic Spectrometry, p. 1058 (1998) (6 pages).
Seko et al., "Fine Fibrous Amidoxime Adsorbent Synthesized by Grafting and Uranium Adsorption-Elution Cyclic Test with Seawater", Separation Science and Technology, vol. 39, No. 16, pp. 3753-3767 (2005).

* cited by examiner

| Elemental Analysis (EDS) | | |
|---|---|---|
| Element | Concentration (wt%) | Concentration (atom%) |
| Oxygen | 46.70 | 43.47 |
| Carbon | 43.37 | 53.77 |
| Uranium | 4.88 | 0.31 |
| Chlorine | 2.49 | 1.05 |
| Phosphorus | 1.33 | 0.64 |
| Magnesium | 0.71 | 0.43 |
| Sodium | 0.52 | 0.34 |

| Monomer | Structure | $D_g(\%)$ | $K_d$ for uranium |
|---|---|---|---|
| Diethyl allyl phospate | ![structure] H₃C—O—P(=O)—O—CH₂—CH=CH₂ | 0 | $1.2 \times 10^2$ |
| Vinylphosphonic acid | H₂C=CH—P(=O)(OH)(OH) | 1.6 | $1.7 \times 10^2$ |
| Dimethyl vinylphosphonate | H₃C—O—P(=O)(O—CH₃)—O—CH=CH₂... | 5.1 | $1.8 \times 10^2$ |
| Dimethyl vinyl phosphonate | H₂C=CH—P(=O)(OCH₃)(OCH₃) | 10.0 | $3.5 \times 10^2$ |
| Bis (2-methacryloxyethyl) phosphate (B2MP) | (CH₂=C(CH₃)—C(=O)—O—CH₂—CH₂—O)₂—P(=O)—OH | 70.0 | $5.0 \times 10^4$ |

Fig. 8

POLYMERS GRAFTED WITH ORGANIC PHOSPHOROUS COMPOUNDS FOR EXTRACTING URANIUM FROM SOLUTIONS

CROSS REFERENCE TO RELATED APPLICATIONS

This application claims the benefit of, and priority to, U.S. Provisional Patent Application Ser. No. 61/691,115 filed on Aug. 20, 2012 entitled "POLYMERS GRAFTED WITH ORGANIC PHOSPHOROUS COMPOUNDS FOR EXTRACTING URANIUM FROM SOLUTIONS," by C. Tissot et al.; the entire contents thereof are incorporated by reference herein.

GOVERNMENT RIGHTS

The present disclosure was made with U.S. Government support under Grant No. DEAC07051D14517 awarded by the U.S. Department of Energy. The U.S. Government has certain rights in the present disclosure.

BACKGROUND

1. Technical Field

The present disclosure relates to compositions of matter suitable for extracting uranium from seawater and to methods of using such compositions of matter for extracting uranium from seawater. More particularly, the present disclosure relates to synthesizing a graft adsorbent onto a polymer having a shape suitable for towing through seawater to adsorb the uranium.

2. Background of Related Art

Due to ever-increasing global demand, Earth's uranium resources are no longer sufficient for another century of present-day nuclear power plant capacity. The world's 435 nuclear reactors currently in operation require approximately 67,990 tonnes of Uranium per year [(World Nuclear Association. World Nuclear Power Reactors & Uranium Requirements (2013)]. With known Uranium resources estimated at 5.3 Megatonnes, this estimates less than 80 years of reactor operation without highly cost-prohibitive exploration [World Nuclear Association. Supply of Uranium. (2012)].

Even with an average concentration of only 3.3±0.2 µg/L (or 3.3±0.2 ppb) [Ku, The-Lung; Knauss, K.; Mathieu, G. (1977). Uranium in Open Ocean: Concentration and Isotopic composition. Deep Sea Research, Vol. 24, Issue 11, pp. 1005-1017], the world's oceans are by far the largest uranium resource on Earth. Since the inception of research and development surrounding the extraction of uranium from seawater, the requirements and characteristics of the "ideal sorbent" have been defined in an attempt to improve and advance technology. These needs have changed little over time since the 1950's and are still applicable today despite significant advances. Performing optimization of an adsorbent based upon the following factors will serve to increase the extraction efficiency and, subsequently, reduce cost:

Very high distribution coefficient, ($K_d$);
High selectivity for uranium;
High loading capacity;
Rapid loading kinetics; and
Capacity for regeneration.

Many materials, including organic and inorganic sorbents, ion exchangers and coated particles have been developed for removing desired solutes from solutions. For instance, uranium can be removed from aqueous solutions by contacting said solutions with a cation exchange to sorb positive ions such as $UO_2^{2+}$ or $U^{4+}$.

Uranium can also be removed with an anion exchanger to sorb negative ions such as $UO_2(CO_3)_2^{2-}$ or $UO_2(CO_3)_3^{4-}$ or $UO_2(SO_4)_3^{4-}$. However, sorbents, ion exchangers, and coated particles are generally available in particulate form, and they have to be packed into columns or beds through which the solution of interest is made to flow. This design has both technical and economic drawback. Packed columns are prone to fouling and clogging, and they require a pressure differential to force the solution through the column. Often this requires the use of pumps, rather than gravity, to maintain the flow, especially when the packing consists of fine particles which make the contact with the solution more effective, resulting in improved uptake of the solute of interest, but also offer higher resistance to flow.

To overcome such problems, it is possible to use a graft adsorbent that can be synthesized by grafting an aldoxime-containing moiety onto a polymer like polyethylene having a variety of shapes such as a membrane, cloth or fiber [Seko, N.; Tamada, M.; Yoshii, F. (2005) Current Status of Adsorbent for Metal Ions with Radiation Grafting and Crosslinking Techniques. *Nuclear Instruments and Methods in Physics Research B* 236, 21-29]. This makes it possible to contact the adsorbent with the solution without confining it in a packed column, for instance, by submerging the polymer in the solution or towing it through the solution.

Polymer adsorbents for uranium have been prepared by radiation-induced grafting of an active adsorber or its precursor onto a polymer. The most common technique is to conduct radiation-induced graft polymerization of acrylonitrile onto a polyethylene fiber, followed by treatment of the resulting cyano group with hydroxylamine to convert it to an amidoxime group [Saito, K.; Uezu, K.; Hori, T.; Furusaki, S.; Sugo, T.; Okamoto, J. (1988) Recovery of Uranium from Seawater Using Amidoxime Hollow Fibers. *AIChE Journal* 34. 411-416].

The bulk of the work done so far on the extraction of uranium from seawater using polymeric adsorbents has been performed using amidoxime adsorbents [Seko, N.; Katakai, A.; Hasegawa, S.; Tamada, M.; Kasai, N.; Takeda, H.; Sugo, T. (2003) Aquaculture of Uranium in Seawater by a Fabric-Adsorbent Submerged System. *Nuclear Technology* 144, 274-278].

According to previously published studies, fibrous Zr-loaded phosphoric adsorbent was synthesized by grafting of a monomer having phosphoric acid onto nonwoven fabric. The nonwoven fabric was composed of polyethylene-coated polypropylene. The 2-hydroxyethyl methacrylate phosphoric acid monomer was composed of phosphoric acid mono (50%) and di (50%) ethyl methacrylate ester. Following graft polymerization of the monomer through the use of electron beam radiation, Zr(IV) was loaded onto the resulting phosphoric adsorbent by contacting Zr(IV) solution, made by dissolving $ZrO(NO_3)_2 \cdot 2H_2O$ in nitric acid solution, with the adsorbent in a packed column. The resulting Zr(IV)-loaded phosphoric chelate adsorbent was shown to effective in removing arsenic(V) from solutions over the pH range from 1 to 9 [Seko, N.; Basuki, F.; Tamada, M.; Yoshii, F. (2004) Rapid Removal of Arsenic(V) by Zirconium(IV) Loaded Phosphoric Chelate Adsorbent Synthesized by Radiation Induced Graft Polymerization. *Reactive and Functional Polymers* 59, 235-241]. However, there have been no reports indicating that this Zr(IV)-loaded phosphoric chelate adsorbent is effective in removing uranium from aqueous media. The same product of radiation-induced grafting of 2-hydroxyethyl methacrylate phosphoric acid monomer onto a nonwoven fabric composed polyethylene-coated polypropylene fiber serving as a trunk polymer was observed to remove lead and cadmium from solutions at the pH range between 1 and 6 [Basuki, F.; Seko, N.; Tamada, M.; Sugo, T.; Kume, T. (2003) Direct Synthesis of Adsorbent Having Phosphoric Acid with Radiation Induced Graftpolymerization. *Journal of Ion Exchange* 14 supplement, 209-212]. Later on, a similar phosphoric acid adsorbent was used to recover uranium from solutions with a pH as low as 0.5. This adsorbent was concluded to be applicable for the recovery of uranium from acidic waste solutions [Seko, N.; Tamada, M.; Yoshii, F. (2005) Current Status of Adsorbent for Metal Ions with Radiation Grafting and Crosslinking Techniques. *Nuclear Instruments and Methods in Physics Research B* 236, 21-29.]. It was not mentioned as a potential adsorbent for uranium from seawater. The current technology for extraction of uranium from seawater is still based on the attachment of amidoxime groups to polymers [Tamada, M. (2009) Current Status of Technology for Collection of Uranium from Seawater].

Despite the large amount of work performed to improve the performance of amidoxime-containing adsorbents prepared by amidoximation of acrylonitrile groups on polyolefin adsorbents, and despite major improvements made so far, such as development of suitable fibers, radiation-induced grafting, co-grafting with acrylonirile/methacrylic acid mixtures to enhance hydrophilicity, braid adsorbent configuration, etc., adsorption rates and adsorption capacities achievable using such adsorbents remain limited due to factors such the pH of seawater and competition by other dissolved metals.

The uranium uptake from seawater obtained using the most current technologies, i.e. braids consisting of thin (e.g., 0.1-mm) polyethylene fibers radiation-grafted with amidoxime groups, is limited to no more than about 1.5 g U/kg adsorbent at 30° C. and 1 g U/kg adsorbent at 20° C., even over contact periods of 40 days between the adsorbent and seawater (Takeda et al., 1991; Seko et al., 2005, Tamada, 2009). [Takeda, T.; Saito, K.; Uezu, K.; Furusaki, S.; Sugo, T.; Okamoto, J. (1991) Adsorption and elution in hollow-fiber-packed bed for recovery of uranium from seawater. *Industrial and Engineering Chemistry Research* 30, 185-190; Seko, N.; Tamada, M.; Yoshii, F. (2005) Current status of adsorbent for metal ions with radiation grafting and crosslinking techniques. *Nuclear Instruments and Methods in Physics Research B* 236, 21-29; Tamada, M. (2009) Current status of technology for collection of uranium from seawater. *Erice Seminar*, August 2009]. It has been observed that the adsorption capacity of amidoximated fibers for uranium is highest at pH values between pH 3-4 and 6, and is considerably lower (by a factor of approximately 3) at the pH of seawater around 8.2 [Zhang, A.; Uchiyama, G.; Asakura, T. (2003) The adsorption properties and kinetics of uranium (VI) with a novel fibrous and polymeric adsorbent containing N-[2-(diethoxyphosphoryl)-ethyl] chelating functional group from seawater. *Separation Science and Technology* 38, 1829-1849]. At this pH range, the major form of uranium(VI) is the anionic species $UO_2(CO_3)_3^{4-}$. However, the form being adsorbed on the amidoxime sites is the $UO_2^{2+}$ cation, and decomplexation of $UO_2(CO_3)_3^{4-}$ into $UO_2^{2+}$ is a rate-determining step in the sorption of U(VI) from seawater [Das, S.; Pandey, A. K.; Athawale, A. A.; Manchanda, V. K. (2009) Exchanges of uranium(VI) species in N-[2-(diethoxyphosphoryl)-ethyl]-functionalized sorbents. *Journal of Physical Chemistry B* 113, 6328-6335]. Accordingly, the use of complexing groups more efficient than amidoxime in reacting with uranium over a broader range (from 5-6 to 8.5), or of a combination of different adsorbing groups [Hazer, O.; Kartal, S. (2009) Synthesis of a novel chelating resin for the separation and preconcentration of uranium(VI) and its spectrophotometric determination. *Analytical Sciences* 25, 547-551] could result in higher capacities and adsorption rates.

Furthermore, the limited capacities and low adsorption rates of amidoxime containing adsorbents for U(VI) cannot be exclusively attributed to the discrepancy in pH between seawater and the optimum range of adsorbent performance. Other ions present in seawater also compete for the adsorption sites. Reported distribution coefficients ($K_d$) for various metals follow the order V>>Fe>Ni>Mn>Co>U>>Cu>Zn>>Ca>Mg [Suzuki, T.; Saito, K.; Sugo, T.; Ogura, H.; Oguma, K. (2000) Fractional elution and determination of uranium and vanadium adsorbed on N-[2-(diethoxyphosphoryl)-ethyl] fiber from seawater. *Analytical Sciences* 16, 429-432] or Pb>>Co>Ni>Fe>U>Al>Ti>>K>Na [Tamada, M. (2009) Current status of technology for collection of uranium from seawater. *Erice Seminar*, August 2009]. Taking into account the concentrations of the various dissolved metals in seawater, it follows that several of them, including both high-$K_d$, low-concentration ions such as V, Fe, Pb and Ni and low-$K_d$, high-concentration ions such as Al and Mg, are taken up by fibers at concentrations comparable to, and even higher than those of uranium. The data indicate that more >90% of the capacity of the adsorbent is taken up by adsorbed metal ions other than U(UI).

SUMMARY

The embodiments of the present disclosure relate to identification of complexing or chelating agents that offer strong, selective bonding with uranium as well as a broad pH range of effectiveness, specifically including the pH range around 8.2, together with the acrylic double bonds required for radiation-induced grafting on polymers.

The novel adsorbing species of the present disclosure are phosphorus-containing molecules, in particular organic phosphates, phosphonates and phosphoric acids. Thus, according to one aspect of the present disclosure, organic phosphorus compounds, for example, organic phosphates, phosphonates, and phosphoric acids, are attached to polymer fibers to form fibers, fiber fabrics or membranes that are effective, or show activity, in uranium adsorption.

More particularly, one exemplary embodiment of the present disclosure relates to an adsorbent material prepared by a process of radiation grafting by using a source of ionizing radiation to irradiate an organic phosphate with a C=C bond or to irradiate an organic phosphonate with a C=C bond onto a polymer.

The present disclosure relates also to a method of removing uranium from an aqueous solution that includes the steps of: providing an adsorbent material produced by radiation grafting of an organic phosphate with a C=C bond or organic phosphonate with a C=C bond or an organic phosphonic acid onto a polymer, wherein the radiation grafting is performed by using a source of ionizing radiation to irradiate the organic phosphate with a C=C bond or the organic phosphonate with a C=C bond onto the polymer; and contacting the grafted polymer with the aqueous solution that includes uranium such that the adsorbent material removes an amount of uranium, at least 0.1%, relative to the dry weight of the polymer, from the aqueous solution.

The process of radiation grafting to produce the adsorbent material and the method of removing uranium from an aqueous solution that includes the steps of: providing an adsorbent material produced by radiation grafting of an organic phosphate with a C=C bond or organic phosphonate with a C=C bond or an organic phophonic acid onto a polymer may each include the following steps.

More particularly, the radiation grafting of an organic phosphate or an organic phosphonate or an organic phosphonic acid may be effected using an organic phosphate with more than one C=C bond or using an organic phosphonate with more than one C=C bond, or an organic phosphonic acid. The radiation grafting of an organic phosphate with a C=C bond onto a polymer may be performed by radiation grafting bis(2-methacryloxyethyl)phosphate onto the polymer. The radiation grafting of bis(2-methacryloxyethyl) phosphate onto the polymer may further be performed by radiation grafting bis(2-methacryloxyethyl)phosphate onto a Winged™ polymer. Still further, the radiation grafting bis(2-methacryloxyethyl)phosphate onto a Winged™ polymer may be performed by radiation grafting bis(2-methacryloxyethyl)phosphate onto Winged™ nylon 6.

In one exemplary embodiment, the source of ionizing radiation may be a gamma source providing a total radiation dose of 0.2-50 kGy to effect the grafting. In one exemplary embodiment, the gamma source may provide a total radiation dose of 1-10 kGy to effect the grafting.

In one exemplary embodiment, the radiation grafting may be performed indirectly, with the polymer first irradiated in the absence of oxygen and then contacted with an oxygen-free solution of the organic phosphate or of the organic phosphonate or of the organic phosphonic acid. In a still further exemplary embodiment, the radiation grafting may be performed directly, with the polymer irradiated while immersed in an oxygen-free solution of the organic phosphate or of the organic phosphonate or of the organic phosphonic acid.

In one exemplary embodiment, the polymer may be irradiated while immersed in an oxygen-free aqueous solution of the organic phosphate or of the organic phosphonate or of the organic phosphonic acid. In a still further exemplary embodiment, the polymer may be irradiated while immersed in an oxygen-free aqueous solution containing components selected from the group consisting of surfactants, polar organic liquids, and combinations thereof.

In one exemplary embodiment, the radiation grafting may be characterized by a degree of grafting, defined as the weight gain of the polymer upon grafting and drying relative to its original weight, that is between 25% and 250%. In a still further exemplary embodiment, the degree of radiation grafting may be between 50% and 200%. In yet another exemplary embodiment, the degree of radiation grafting may be between 80% and 150%.

In one exemplary embodiment, the polymer is sonicated following radiation grafting to remove homopolymerized material. In one exemplary embodiment, the adsorbent material, that includes the grafted polymer, is contacted with the aqueous solution, wherein the aqueous solution includes uranium, and the adsorbent material removes an amount of uranium, at least 0.1%, relative to the dry weight of the polymer, from the aqueous solution. In one exemplary embodiment of the adsorbent material and of the method of removing uranium from an aqueous solution, the adsorbent material may be regenerated through desorption of the uranium using an aqueous solution to remove the uranium from the phosphate-grafted polymer or phosphonate-grafted polymer or organic phosphonic acid-grafted polymer. The adsorbent material may be regenerated through desorption of the uranium using an a near-neutral solution of a complexing reagent to remove the uranium from the phosphate-grafted polymer or phosphonate-grafted polymer or organic phosphonic acid-grafted polymer. Still further, the adsorbent material may be regenerated through desorption of the uranium using a near-neutral solution of a complexing reagent that is an aqueous solution of ammonium oxalate to remove the uranium from the phosphate-grafted polymer or phosphonate-grafted polymer or organic phosphonic acid-grafted polymer.

BRIEF DESCRIPTION OF THE DRAWINGS

These and other advantages will become more apparent from the following detailed description of the various embodiments of the present disclosure with reference to the drawings wherein:

FIG. 8 is a table identifying five phosphate or phosphonate-containing vinyl monomers that were tested using the exemplary grafting method of attaching polymer fibers to form fibers, fiber fabrics or membranes, performed through radiation-induced grafting, as illustrated with respect to FIGS. 5 and 6, for uranium adsorption according to one exemplary embodiment of the present disclosure;

DETAILED DESCRIPTION

Figure 1:
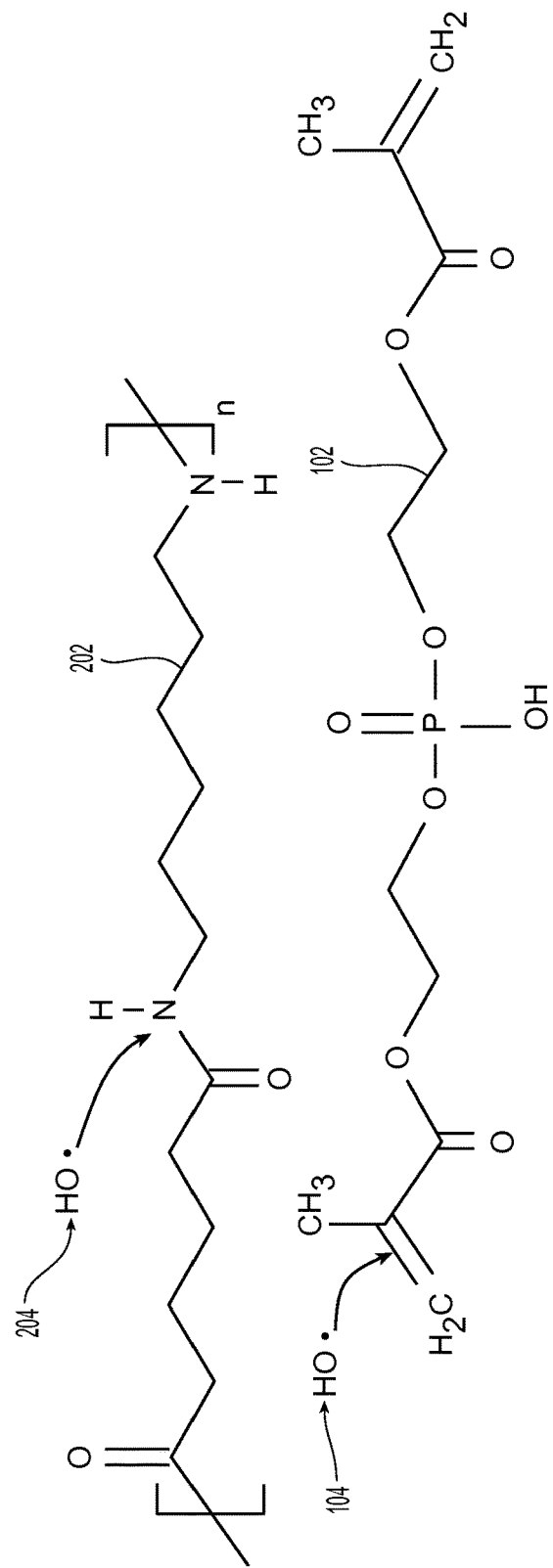
FIG. 1 illustrates an organic phosphorous compound monomer having a free radical HO— grafting site available for grafting at the site of an $H_2C—CH_3$ bond while a polymer fiber has a potential free radical HO— grafting site at the site of an H—N bond according to one exemplary embodiment of the present disclosure.

In the Summary section above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" followed by a number is used herein to denote the start of a range beginning with that number (which may be a range having an upper limit or no upper limit, depending on the variable being defined). For example, "at least one" means one or more than one. The term "at most" followed by a number is used herein to denote the end of a range ending with that number (which may be a range having 1 or 0 as its lower limit, or a range having no lower limit, depending upon the variable being defined). For example "at most 40%" means 40% or less than 40%. When, in this specification, a range is given as "(a first number) to (a second number)" or "(a first number) (a second number)," this means a range whose lower limit is the first number and whose upper limit is the second number. For example, 25 to 100 mm means a range whose lower limit is 25 mm, and whose upper limit is 100 mm.

Effective recovery of uranium from seawater requires not only high capacity for uranium adsorption but also high selectivity. Other ions present in seawater, such as ions of V, Pb, Co, Ni, Fe, Cu, Zn, Al, Ti and, when present Ca and Mg, can also compete for the adsorption sites. When amidoxime-based polymeric adsorbents are used, data reported in the literature indicate that more >90% of the capacity of the adsorbent is taken up by adsorbed metal ions other than U(UI). In addition, adsorbents that are useful in removing uranium from seawater have to exhibit high capacity and high selectivity for uranium in the pH range of seawater around 8.1-8.2 and in the presence of the major anions present in seawater, such as $Cl^-$, $SO_4^{2-}$, and $HCO_3^-$. Furthermore, the adsorbents should also have high rates of reaction with uranium in seawater. Accordingly, a major objective of the present disclosure is identification of complexing or chelating agents that offer strong, selective bonding with uranium as well as a broad pH range of effectiveness, specifically including the pH range around 8.2, together with the acrylic double bonds required for radiation-induced grafting on polymers.

The novel adsorbing species of the present disclosure are phosphorus-containing molecules, in particular organic phosphates, phosphonates and phosphoric acids. Thus, according to one aspect of the present disclosure, organic phosphorus compounds, for example, organic phosphates, phosphonates, and phosphoric acids, are attached to polymer fibers to form fibers, fiber fabrics or membranes that are effective, or show activity, in uranium adsorption.

Figure 2:
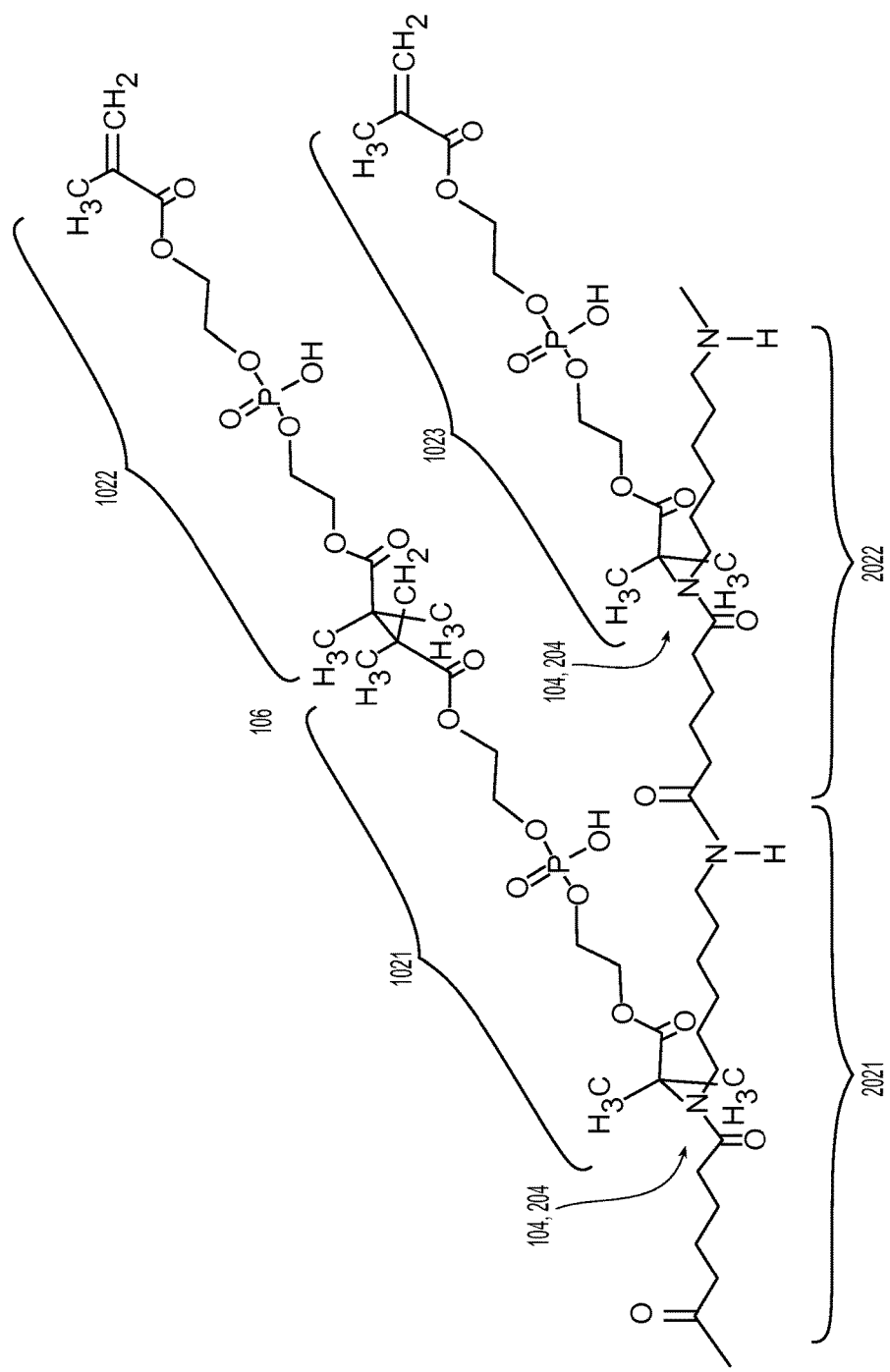
FIG. 2 illustrates a free radical HO— grafting site of organic phosphorous compound monomers grafted to free radical HO— grafting site of polymer fibers according to one exemplary embodiment of the present disclosure.

Referring to FIG. 1, an organic phosphorous compound monomer 102 is illustrated having a free radical HO— grafting site 104 available for grafting at the site of an $H_2C$—$CH_3$ bond. A polymer fiber 202 has a potential free radical HO— grafting site 204 at the site of an H—N bond. In FIG. 2, free radical HO— grafting site 104 of a first organic phosphorous compound monomer 1021 is shown grafted to free radical HO— grafting site 204 of a first polymer fiber 2021. A second organic phosphorous compound monomer 1022 is cross-linked at link 106 to the ungrafted end of the first organic phosphorous compound monomer 1021. Free radical HO— grafting site 104 of a third organic phosphorous compound monomer 1023 is grafted to grafting site 204 of a second polymer fiber 2022.

Figure 3:
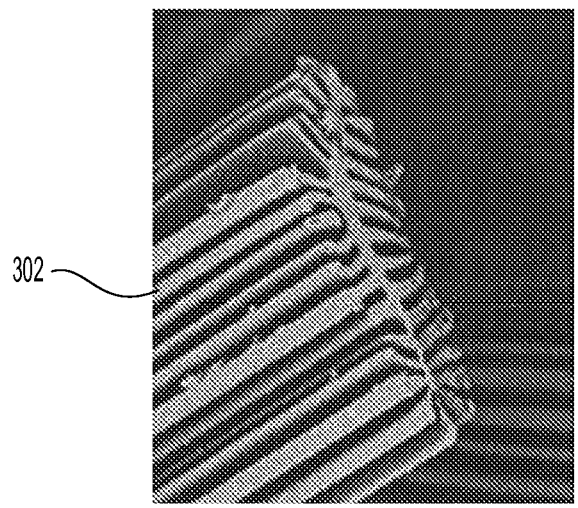
FIG. 3 illustrates a polymeric fiber with the highest currently available surface to volume ratio such as Winged Fiber™.
Figure 4:
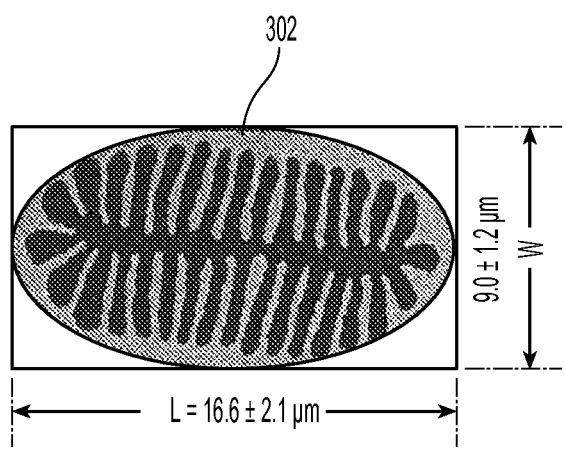
FIG. 4 illustrates exemplary dimensions of the Winged Fiber™ of FIG. 3.

In one embodiment, the shape of fibers, fiber fabrics or membranes defines braids that can be towed through the seawater. FIGS. 3 and 4 illustrate polymeric fibers with the highest currently available surface to volume ratio such as Winged Fiber™ 302 (available from Allasso Industries, Inc., Raleigh, N.C., USA) with specific surface areas of 10-30 $m^2$/g. As illustrated in FIG. 4, exemplary dimensions of the Winged Fiber™ 302 are a width W=9.0±1.2 μm and a length L=16.6±2.1 μm, thereby defining an aspect ratio=W/L=0.54.

Figure 5:
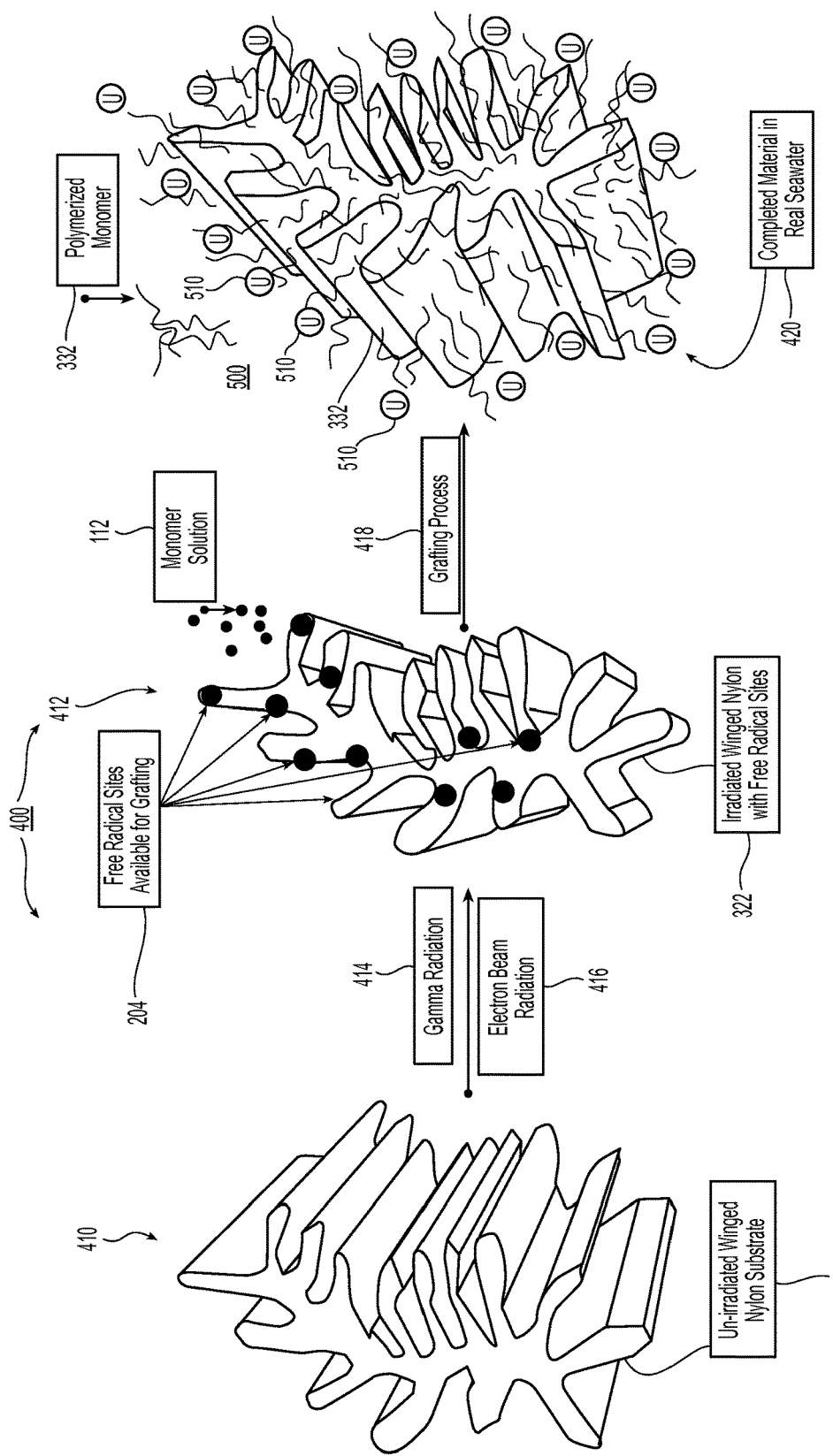
FIG. 5 illustrates at the molecular level an exemplary radiation grafting method of attaching polymer fibers to form fibers, fiber fabrics or membranes performed through radiation-induced grafting according to one exemplary embodiment of the present disclosure.

Winged Fiber™ 302 may be used as one of the polymer fibers 202 to form fibers, fiber fabrics or membranes that are effective in uranium adsorption. The use of such a polymeric fiber 202 as Winged Fiber™ 302 increases the grafting density, and in turn improves the removal efficiency of the uranium far beyond that achievable with simple or hollow fibers. Winged fibers which have become commercially available only recently can be produced from nearly all traditionally spinnable polymer resins, including:
Polypropylene
Polyamides
Polyester FIG. 5 illustrates at the molecular level an exemplary radiation grafting method 400 of attaching polymer fibers to form fibers, fiber fabrics or membranes, e.g., Winged Fiber™ 302, performed through radiation-induced grafting. More particularly with respect to radiation-induced grafting, FIG. 5 illustrates at the molecular level step 410 wherein an un-irradiated Winged Nylon substrate 312 is accessed to enable positioning in a location enabling irradiation of the substrate 312 by radiation. In step 412, the un-irradiated substrate 312 is immersed in a monomer solution 112 that includes organic phosphorous compound monomer 102. In step 414, gamma radiation is applied to the un-irradiated substrate 312 or alternatively in step 416 electron beam radiation is applied to the un-irradiated substrate 312. Free radical HO— grafting sites 104 are created in the monomer solution 112 while free radical grafting sites 204 are created in the now irradiated polymer substrate 322.

In step 418, grafting of the free radical grafting sites 104 and 204 to one another is effected by the irradiation of step 414 or 416 to create a polymerized monomer 332. In step 420, the completed polymerized monomer material 332 is immersed in seawater 500 and adsorption of uranium ions 510 is effected to the surface of the polymerized monomer 332.

Figure 6:
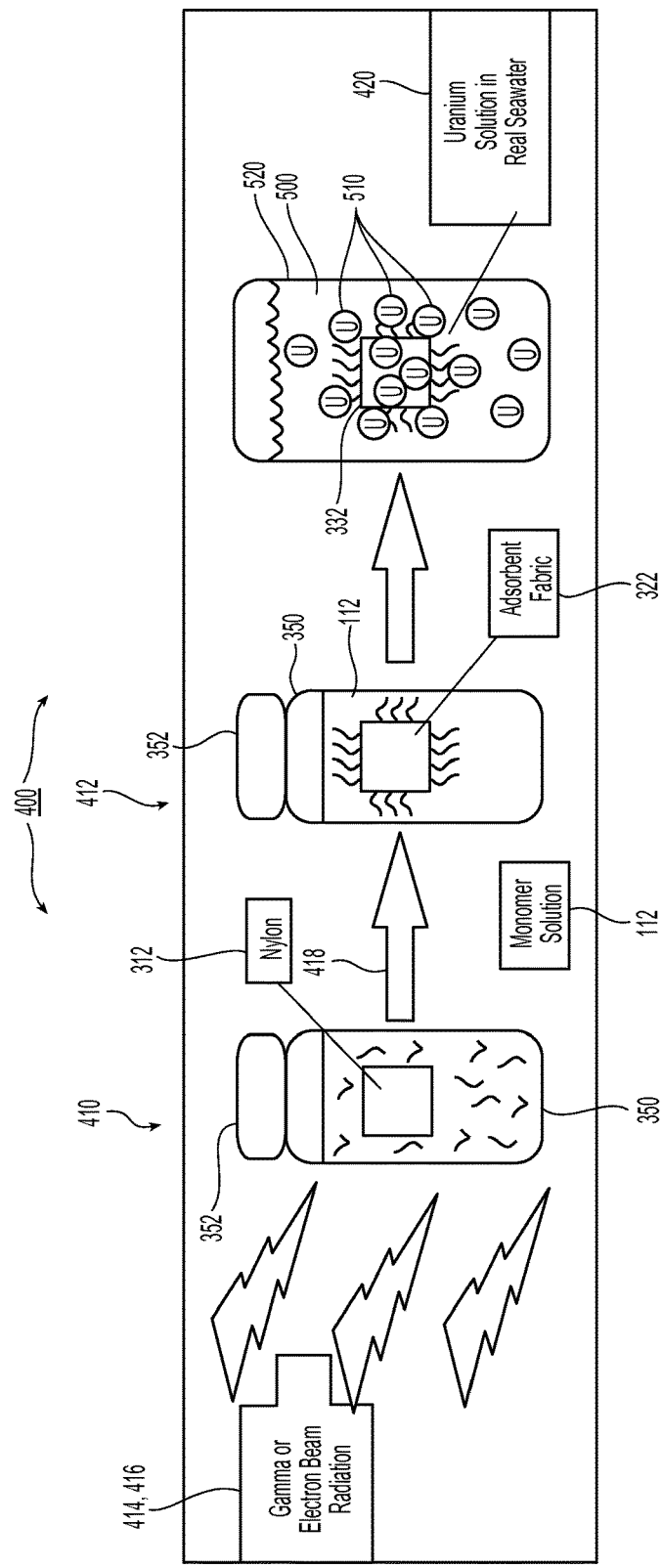
FIG. 6 illustrates at the macroscopic level the exemplary radiation grafting method of FIG. 5 of attaching polymer fibers to form fibers, fiber fabrics or membranes performed through radiation-induced grafting according to one exemplary embodiment of the present disclosure.

FIG. 6 illustrates at the macroscopic level the exemplary grafting method 400 of attaching polymer fibers to form fibers, fiber fabrics or membranes, e.g., Winged Fiber™ 302, performed through radiation-induced grafting described above with respect to FIG. 5. More particularly, step 410 an un-irradiated Winged Nylon substrate 312 is accessed. In step 412, the un-irradiated substrate 312 is immersed in a monomer solution 112 that includes organic phosphorous compound monomer 102 in a container 350 that includes a removable cap 352. In step 414, gamma radiation is applied to the un-irradiated substrate 312 or alternatively in step 416 electron beam radiation is applied to the un-irradiated substrate 312 while immersed in the monomer solution 112. Free radical HO— grafting sites 104 are created in the monomer solution 112 while free radical grafting sites 204 are created in the now irradiated polymer substrate 322 (See FIG. 5).

In step 418, grafting of the free radical grafting sites 104 and 204 to one another is effected by the irradiation of step 414 or 416 to create the polymerized monomer 332. In step 420, the completed polymerized monomer material 332 is immersed in a container 520 of seawater 500 and adsorption of uranium ions 510 to the surface of the polymerized monomer 332. Alternatively, the completed polymerized monomer material 332 may be towed through a source (not shown) of seawater 510.

In one embodiment of the method 400, the polymer is sonicated (not shown) following radiation grafting to remove homopolymerized material (not shown).

As described above, the radiation grafting method 400 may be performed using a source of ionizing radiation. The source of ionizing radiation to implement step 414 is preferably a gamma source, with a total radiation dose of 0.2-50 kGy, preferably 1-10 kGy. The radiation grafting may be performed either indirectly, with the polymer first irradiated in the absence of oxygen and then contacted with an oxygen-free solution of the organic phosphate or of the organic phosphonate, or, in one exemplary embodiment, directly, with the polymer irradiated while immersed in an oxygen-free solution of the organic phosphate or of the organic phosphonate. The solution 112 may be aqueous and it may contain other ingredients such as surfactants or polar organic liquids. The degree of radiation grafting, defined as the weight gain of the polymer upon grafting and drying relative to its original weight, is between 25% and 250%, preferably between 50% and 200%, most preferably between 80% and 150%.

Enhancing the adsorbent efficiency requires understanding of the radiation chemistry mechanisms of the grafting process. This includes understanding the effects of the total dose, dose-rate, type and energy of radiation, and oxygen concentrations on the grafted polymerization. Identification of the radiolytically produced free radicals of the polymers, measuring their bimolecular reaction kinetics and determination of their reaction with molecular oxygen will enhance the uniformity of the grafting.

The radiation strategy is to produce the highest concentrations of free radicals that are available for post irradiation grafting. To achieve this goal, the polymeric fibers are irradiated at the low dose rates described above to hinder the crosslinking reactions, under anaerobic conditions to prevent the reaction of these free radicals with oxygen, and at very low temperatures to decrease the radical-radical-interactions. However, the radiation chemistry alone is insufficient. Therefore, the engineering and processing conditions necessary for the subsequent grafting in monomer solution are integral factors in the cost of the optimal product.

Figures 7, 10:
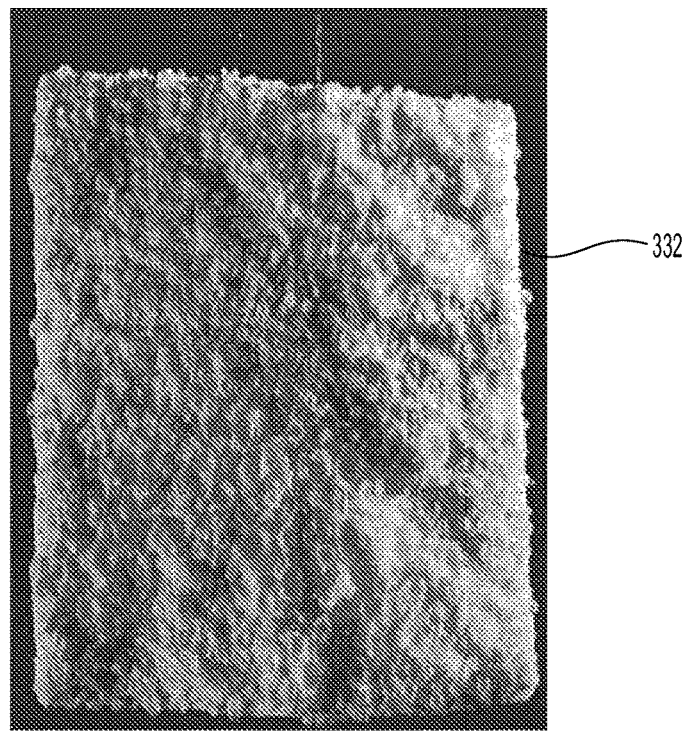
FIG. 7 is a photographic illustration of an adsorbent fabric converted into a polymerized monomer wherein Bis(2-methacryloxyethyl)phosphate (B2MP) has been grafted onto Winged™ nylon according to one exemplary embodiment of the present disclosure.
FIG. 10 illustrates the elemental analysis in concentration by weight percent and concentration by atom percent based on scanning electron microscope (SEM) images of chlorine (Cl), oxygen (O), sodium (Na), uranium (U), magnesium (Mg), and phosphorus (P) of an adsorbent composed of B2MP grafted onto Winged Nylon and elemental analysis for carbon of the adsorbent composed of B2MP grafted onto Winged Nylon according to one exemplary embodiment of the present disclosure.

FIG. 7 is a photographic illustration of adsorbent fabric 312 converted into polymerized monomer 332 wherein Bis(2-methacryloxyethyl)phosphate (B2MP) has been grafted onto Winged™ nylon (e.g., polycaproamide; Nylon 6).

Steps of elution and of regeneration of the adsorbent through desorption of the uranium (not shown in FIGS. 5 and 6) can be effected using an aqueous solution, preferably a near-neutral solution of a complexing reagent, most preferably an aqueous solution of ammonium oxalate, to remove the uranium 510 from the phosphate-grafted polymer 332.

EXPERIMENTAL RESULTS

Example 1

Referring to FIG. 8, five phosphate or phosphonate-containing vinyl monomers were tested using the exemplary grafting method 400 of attaching polymer fibers to form fibers, fiber fabrics or membranes, performed through radiation-induced grafting, as described above with respect to FIGS. 5 and 6, for uranium adsorption through activated carbon testing and preliminary grafting experiments. (Example 2 described below involves activated carbon testing contributing to the results in Table 2.1). The five monomers were: (1) Diethyl allyl phosphate; (2) Vinylphosphonic acid; (3) Dimethyl vinylphosphonate; (4) Diethyl vinyl phosphonate; and (5) Bis(2-methacryloxyethyl)phosphate (B2MP). The molecular structure of each monomer is illustrated in FIG. 8 under "Structure". Monomer B2MP showed the highest degree of grafting, defined as the weight gain of the polymer upon grafting and drying relative to its original weight, $D_g$ (%), and distribution coefficient for uranium, $K_d$.

Preliminary grafting was performed on Bis(2-methacryloxyethyl)phosphate (B2MP) grafted onto polypropylene and nylon in the form of conventional nonwoven fabrics and ultra-high surface area Winged fabrics. Winged nylon showed the highest $K_d$ coefficients for uranium and the highest radiation resistance. The highest degrees of grafting and distribution coefficients were obtained using the "direct" grafting method in which the polymeric substrate is irradiated simultaneously with the monomer solution. Experiments with indirect grafting showed significantly lower degrees of grafting and distribution coefficients, in addition to greater procedure complexity and time required.

Water was selected as a solvent due to the fact that radiation-grafting with water eliminates the need for catalysts and organic solvents ("green" chemistry).

Figure 9:
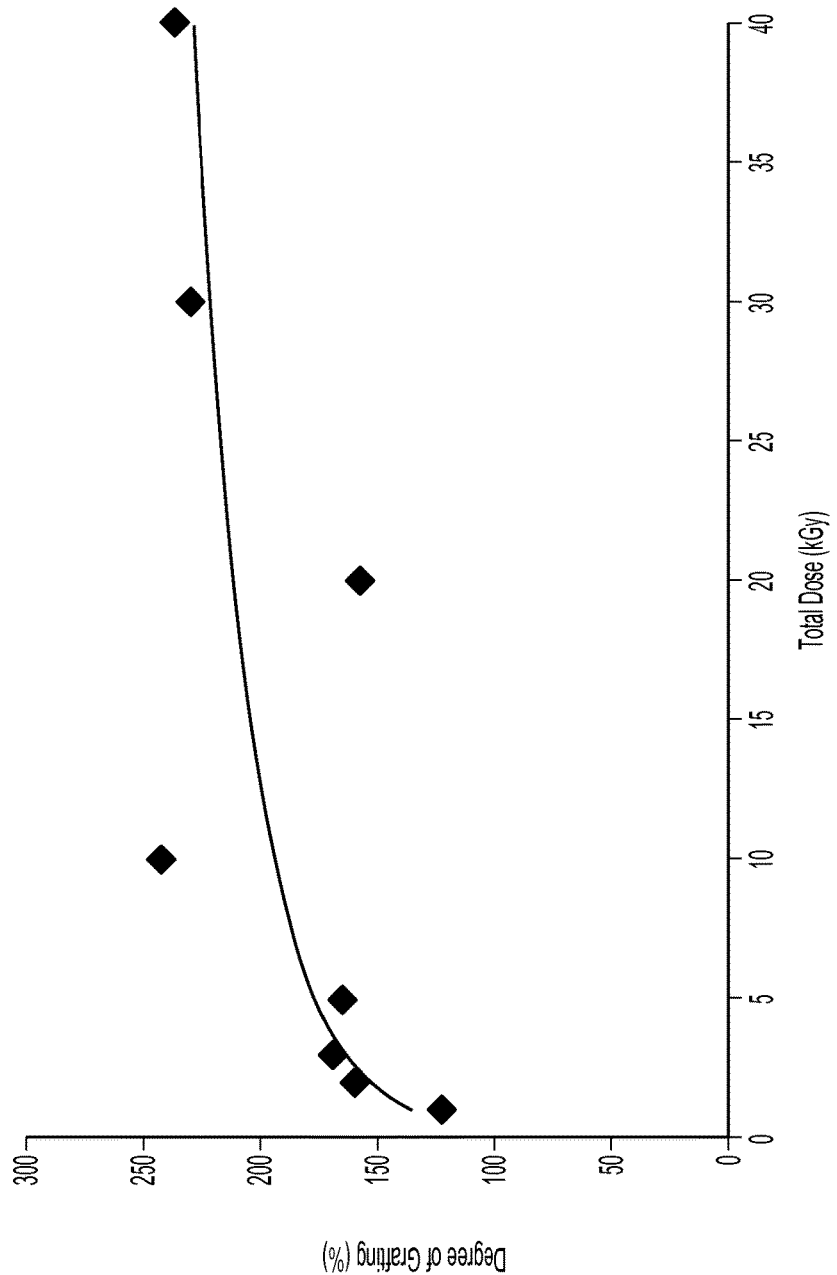
FIG. 9 is a graphical plot of the degree of grafting versus the total dose.

FIG. 9 is a graphical plot of the Degree of Grafting (percent %) (vertical axis) versus the Total Dose (kGy) (horizontal axis). All experiments were performed in real seawater doped to 10 mg-U/L.

TABLE 1.1 illustrates competing reactions that were observed during the experimental trials.

TABLE 1.1

COMPETING REACTIONS:

•OH + M → HO—M•
•OH + P → HO—H + P•
P• + M → P—M• P• + M• → P—M
M• + M• → M—M
P• + P• → P—P

FIG. 10 illustrates the elemental analysis (EDS) in concentration by weight percent (wt %) and concentration by atom percent (atom %) for scanning electron microscope (SEM) images with elemental compositions of an adsorbent composed of B2MP grafted onto Winged™ Nylon. The spectrum was obtained after contact with real seawater for one hour. SEM images were taken of chlorine (Cl), oxygen (O), sodium (Na), uranium (U), magnesium (Mg), and phosphorus (P). Additionally, elemental analysis for carbon was also performed.

Optimization of Grafting Variables

Co-60 irradiation produced higher uniformity with less homopolymerization as compared to electron beam irradiation. Irradiation and grafting were performed at 10 kGy/hr for 4 hours (direct method). Such irradiations typically produced degrees of grafting between 75 and 150%.

Regeneration

Figure 11:
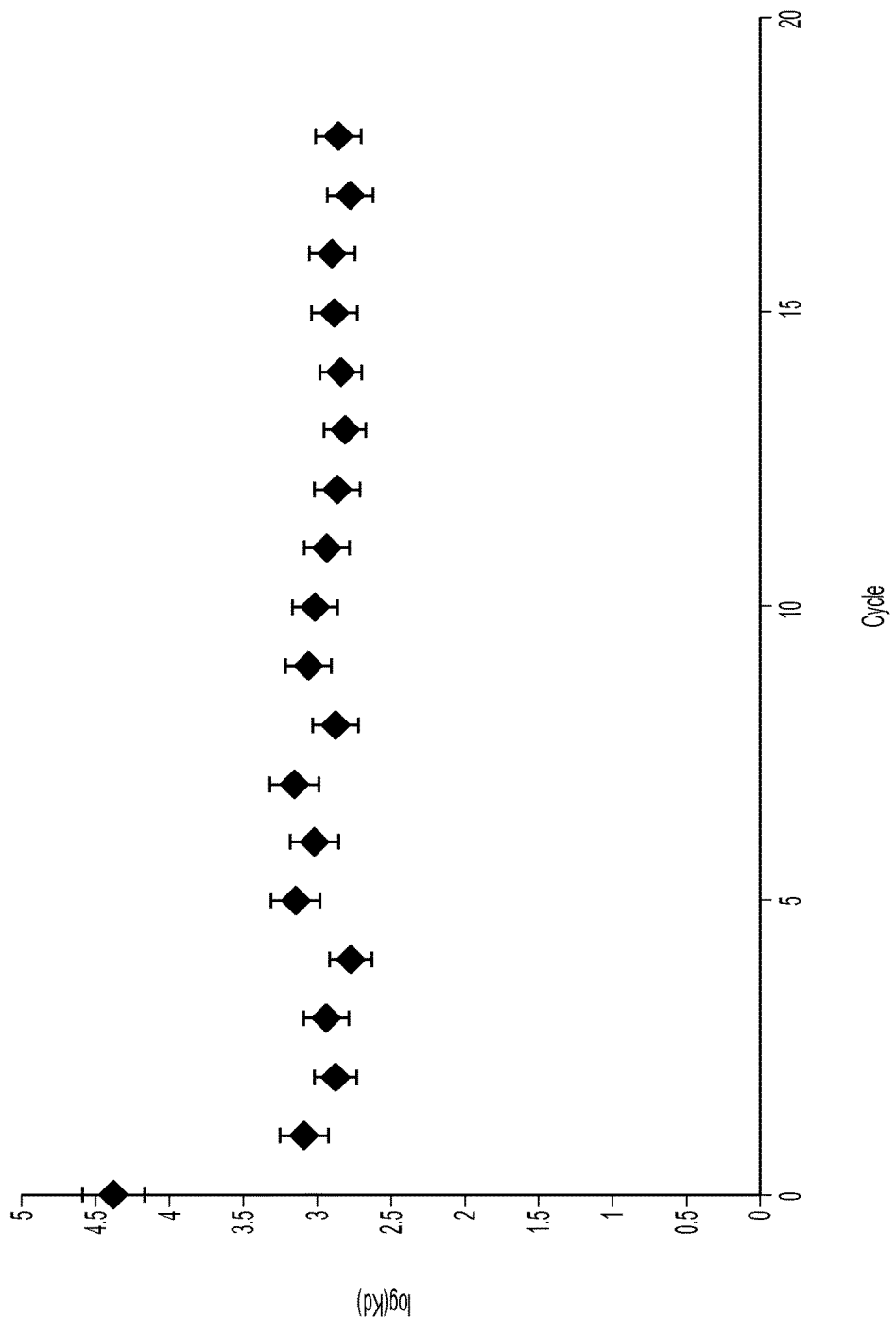
FIG. 11 is a graphical plot of the results of elution and regeneration which were performed on a single grafted adsorbent using 1 M ammonium oxalate for eighteen cycles according to one exemplary embodiment of the present disclosure.

FIG. 11 is a graphical plot of the results of elution and regeneration which were performed on a single grafted adsorbent using 1 M ammonium oxalate for eighteen cycles. The log ($K_d$) (vertical axis) is plotted versus the number of cycles (horizontal axis). Remarkably, for all practical purposes, no decrease in adsorbent performance was observed from cycle 1 to 18, as evidenced by the slight variation in log ($K_d$) from a maximum value of about 3.2 to a minimum value of about 2.8.

Loading of U

Figure 12:
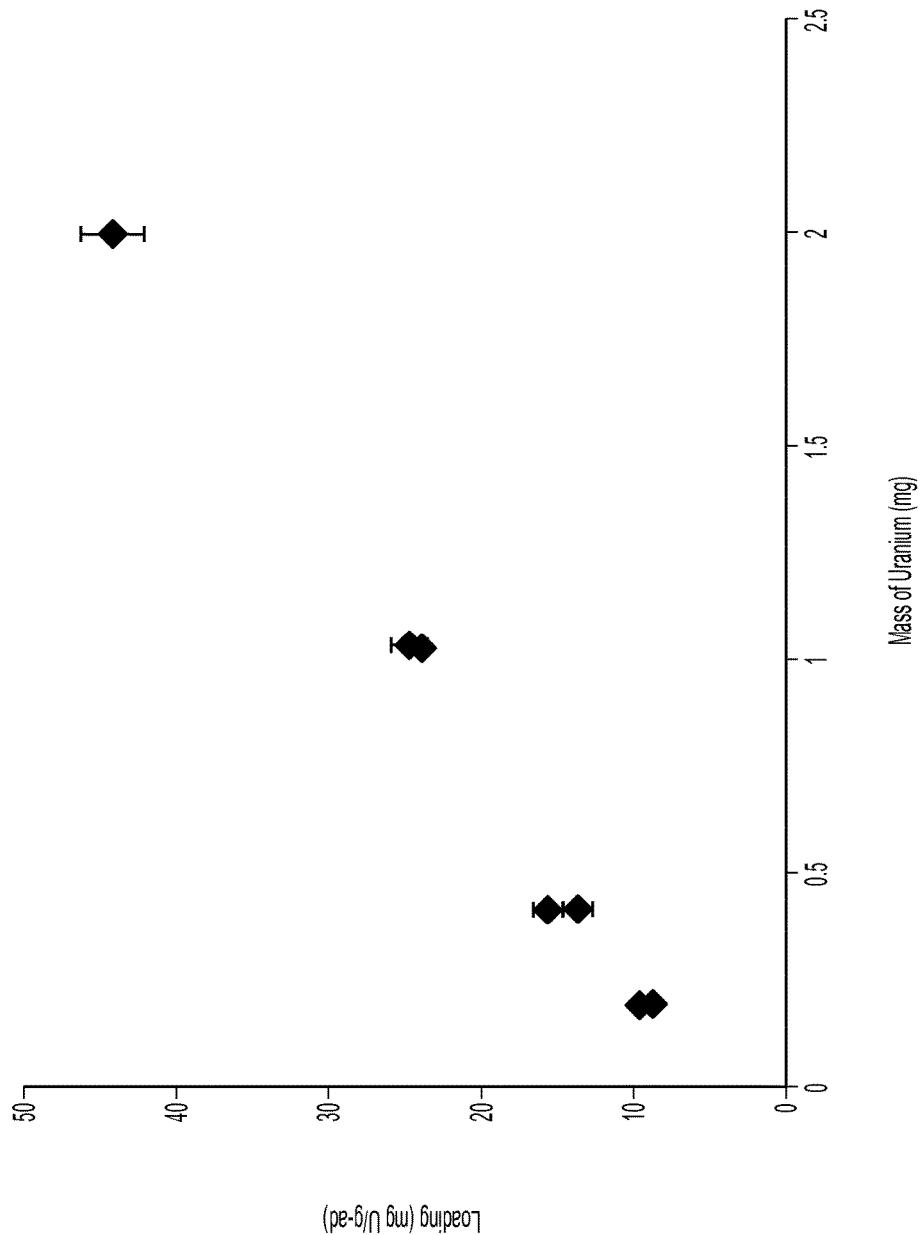
FIG. 12 is a graphical plot of the loading of uranium versus the mass of uranium according to one exemplary embodiment of the present disclosure.

FIG. 12 is a graphical plot of the loading of uranium (mg U/g-adsorbent) (vertical axis) versus the mass of uranium (mg) (horizontal axis). Preliminary tests in real seawater revealed loadings of up to 4.5 wt % U (about 45 mg U/g-adsorbent).

Overall Sample Results

Distribution coefficients greater than $2.0 \times 10^4$ mL/g were obtained.

The adsorbent is capable of at least 18 cycles of regeneration with no decrease in performance.

The fabrication process involves no initiators or catalysts, no organic solvents, no heating or cooling and minimal post-irradiation processing.

The adsorbent is capable of obtaining uranium loadings of at least 4.5 wt %, even in the presence of competing ions.

Additional tests for regeneration, environmental compatibility, maximum loading and loading kinetics are ongoing.

Work to determine the maximum loading of U on the adsorbent, as well as the kinetics of loading is currently ongoing.

Example 2

A new type of adsorbent based on phosphate functional groups radiation-grafted onto ultra-high surface area Winged fibers were developed and tested for adsorption capacity of uranium in real seawater. This adsorbent was fabricated using a 1-9 MeV electron beam linear accelerator (LINAC) and a 100 kCi Co-60 gamma irradiator each located at the University of Maryland. The LINAC employed for the radiation grafting process featured a variable pulse repetition rate of (50-350 pps) and a 3-μs pulse width. Single pulse mode is available for pulse radiolysis. The Co-60 gamma irradiator featured dose rates of 0.2 to 65 kGy/hr. A movable source rack allowed for irradiation of virtually any sample size. If desired, the dose rate may extend from about 100 kGy/hr to about 0.2 kGy/hr and preferably be applied at about 20 kGy/hr.

Five acrylated phosphate-containing monomers were grafted onto ultra-high surface area Winged polymeric fibers (in the form of nonwoven nylon-6).

The conditions of grafting were explored in order to obtain high capacities of the grafted adsorbent for sorption of uranium from seawater. The samples were tested for adsorption from Atlantic Ocean seawater collected at 34.7° N, 76.7° W and enriched with uranium by adding a uranyl acetate solution to 10 mg-U/L (unless otherwise noted). These solutions were analyzed for U before and after rotating 10 mL of test solution with a grafted polymer sample for 1 hour at 30 rpm. The decrease in uranium concentration upon contact with the grafted polymer, normalized to the weight of the adsorbent, was used to calculate the distribution coefficient ($K_d$, mL/g) of the adsorbent in seawater environment. Grafting was performed using the "direct" method, in which the polymeric substrate is irradiated simultaneously with the monomer solution. Experiments with indirect grafting showed significantly lower degrees of grafting and distribution coefficients, in addition to greater procedure complexity and time required.

After verification of uranium adsorption using activated carbon, five phosphate-containing monomers were grafted onto Winged™ nylon-6. The conditions of grafting and the resulting distribution coefficients are shown in TABLE 2.1. The results indicated that bis(2-methacryloxyethyl)phosphate (B2MP) is, by far, the most effective of the five compounds.

TABLE 2.1

Distribution Coefficients Obtained for Uranium in Seawater with Nylon Grafted with Various Phosphonate Compounds.
Co-60 γ radiation at 5 kGy/hr for one hour, room temperature, direct grafting

| | Compound | Observed $K_d$, mL · g$^{-1}$ |
|---|---|---|
| ]. | diethylallylphosphonate | $1.2 \times 10^2$ |
| ]. | vinylphosphonic acid | $1.7 \times 10^2$ |
| ]. | dimethylvinylphosphonate | $1.8 \times 10^2$ |
| ]. | diethylvinylphosphonate | $3.5 \times 10^2$ |
| ]. | bis(2-methacryloxyethyl)phosphate (B2MP) | $6.3 \times 10^4$ |

The high distribution coefficient observed for the adsorbent grafted with B2MP can be attributed to the fact that this compound, unlike the four others, has two, rather than one, double bonds on the two sides of the phosphonate group.

Adsorbents prepared by grafting B2MP onto Winged nylon-6, fibers were found to have much higher $K_d$ values and greater retention of mechanical properties after irradiation than those prepared with conventional nonwoven nylon-6 fibers, poly(tetrafluoroethylene-co-hexafluoropylene) fibers or polypropylene fibers. Both Winged and conventional polypropylene showed very poor radiation resistance, despite favorable degrees of grafting and high distribution coefficients when grafted with B2MP.

Electron paramagnetic resonance (EPR) using a Bruker X-band with temperature-controlled sample holder was performed on irradiated nylon-6 to investigate the behavior of the surface radicals and to determine the radical half-life.

Figure 13:
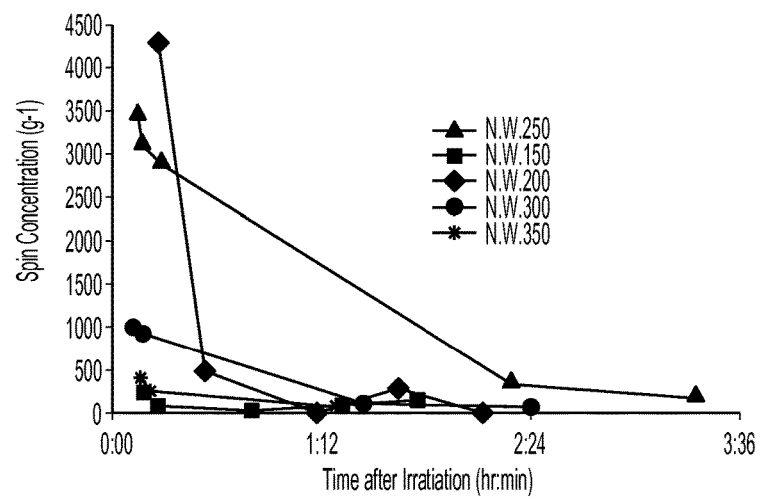
FIG. 13 is a graphical plot showing the spin concentration and decay of free radicals produced on Winged nylon under electron beam irradiation to various radiation levels according to one exemplary embodiment of the present disclosure.

FIG. 13 shows the spin concentration and decay of free radicals produced on Winged nylon under electron beam irradiation to 150, 200, 250, 300 and 350 kGy (1.9 Gy/3-µs pulse). Irradiations were performed in the absence of oxygen and at room temperatures to best simulate grafting conditions. Radical half-life was determined to be on the order of $10^3$ seconds, suggesting that the direct grafting method should be considered. The distribution coefficients of the product are related to the degree of grafting, which is reflected in the weight gain of the substrate upon being subjected to radiation grafting of the phosphate species. In general, distribution coefficients $K_d$ higher than $1 \times 10^4$ ml·g$^{-1}$ were obtained when the grafting density exceeded 80%. The highest values of $K_d$ were obtained when the grafting densities were in the range of 100-120%. For degrees of grafting higher than approximately 160%, distribution coefficients IQ were shown to decrease rapidly. This indicates that the number of active sites on the polymer no longer increases, probably due to homopolymerization of the complexing monomer.

After insufficient degrees of grafting were obtained using lower alcohols, water was selected as solvent despite complete dissolution only at very low monomer concentration. The use of water as a solvent is highly desirable, with advantages including the elimination of organic solvents and the production of less hazardous waste. Grafting with an emulsion of B2MP and water produced highly favorable results, however; careful control over the conditions of the irradiation was required due to the formation of undesirable homopolymerization.

Figure 14:
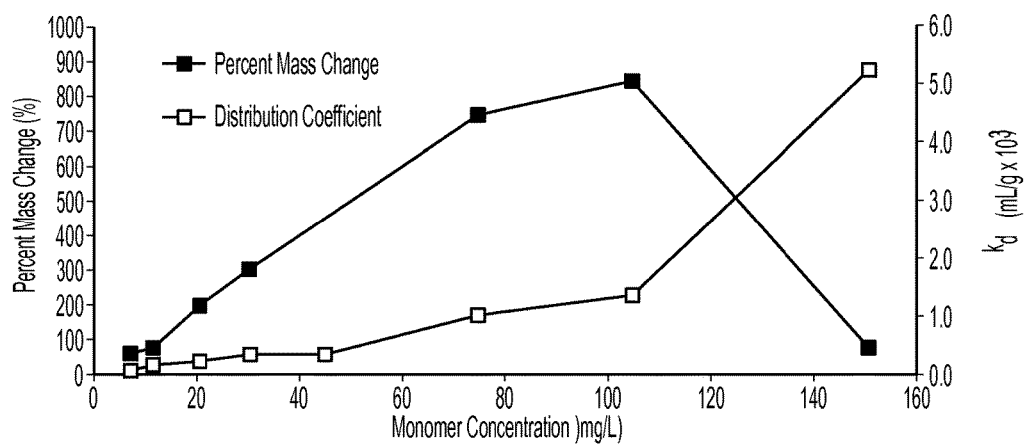
FIG. 14 is a graphical plot showing the effect of monomer (B2MP) concentration the percent mass change degree of grafting) (left vertical axis and distribution coefficient versus monomer concentration according to one exemplary embodiment of the present disclosure.

FIG. 14 shows the effect of monomer (B2MP) concentration the percent mass change (degree of grafting) (left vertical axis) and distribution coefficient $K_d$(mL/g$\times 10^3$) (right vertical axis) versus monomer concentration (mg/L) (horizontal axis). The rapid rise in percent mass change and associated decrease in distribution coefficient past 100 mg/L B2MP suggests the presence of homopolymerization. The presence of homopolymerization was also easily identified upon visual inspection of the grafted polymer after drying.

Optimization of irradiation conditions was performed to develop an adsorbent that is both highly effective and practical. The effect of total dose, dose rate and type of radiation on the degree of grafting was determined.

Experiments performed with electron beam showed excessive homopolymerization in the monomer emulsion, even at low dose rates. Subsequent experiments with Co-60 gamma radiation showed high uniformity, with much greater control over irradiation conditions.

Distribution coefficients $K_d$ higher than $1 \times 10^4$ mL·g$^{-1}$ were obtained with dose rates in the range of 1-10 kGy·hr$^{-1}$. An intermediate dose rate of 10 kGy/hr was selected for adsorbent fabrication, as higher dose rates produced significant homopolymerization and lower dose rates (<5 kGy/hr) were deemed impractical due to the long irradiation times required.

Figure 15A:
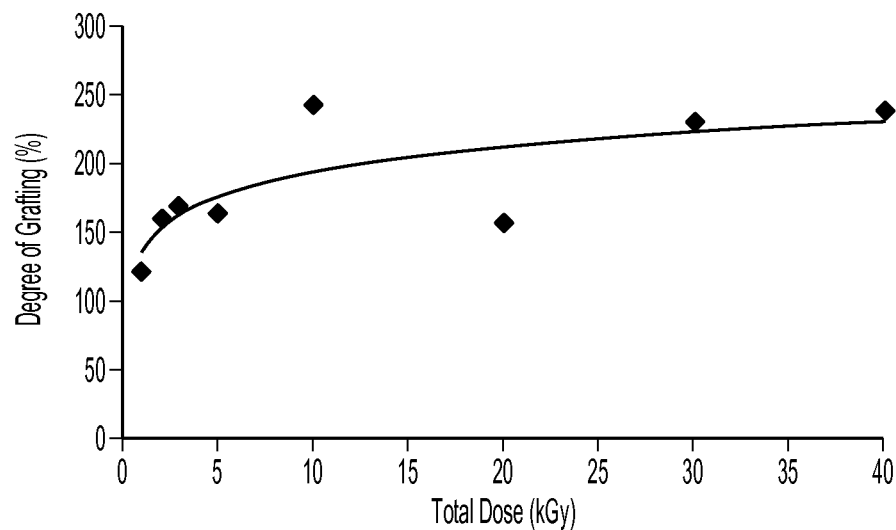
FIG. 15 is a graphical plot showing the effect of total dose on the degree of grafting according to one exemplary embodiment of the present disclosure.
Figure 15B:
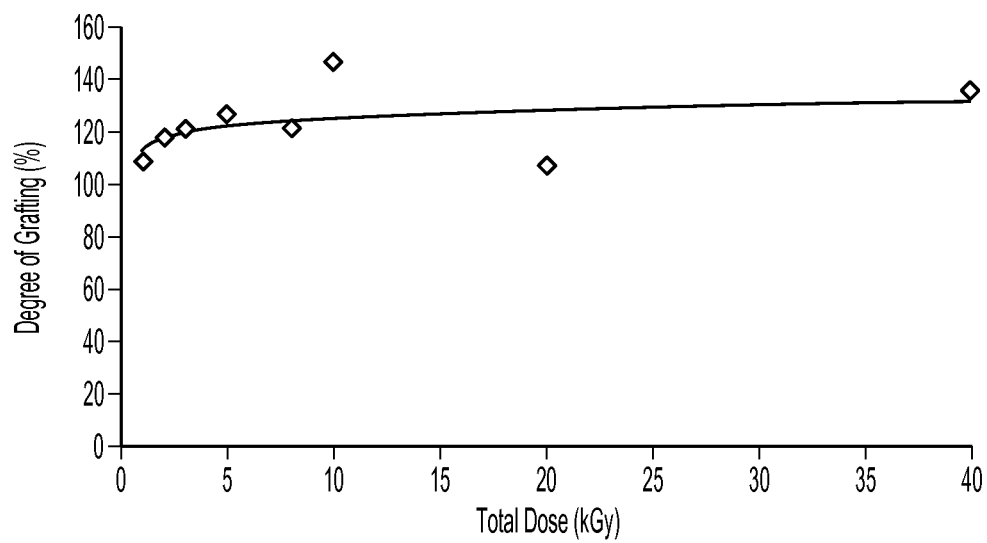

FIG. 15 illustrates the effect of total dose (kGy) (horizontal axis) on the degree of grafting (%) (vertical axis). 40 kGy was selected as the target dose, as only slight increases in degree of grafting were observed after 40 kGy (4 hours irradiation time at 10 kGy/hr).

Distribution coefficients higher than $5 \times 10^3$ were shown to correspond to a percent sorption of uranium from seawater (doped to 10 mg-U/L) greater than 97%. Samples grafted at intermediate dose rates (5-10 kGy/hr) and high total doses (>30 kGy/hr) consistently revealed uranium loadings between 6 and 8 mg-U/g-adsorbent after one hour of contact with real seawater doped to 10 mg/L U. It should be noted that under testing conditions involving a 20-mg adsorbent sample immersed in 10 mL of seawater doped with 20 mg/L U, a distribution coefficient of $1 \times 10^4$ mL/g corresponds to a loading of 9.5 mg U/g-adsorbent and to removal of 95% of the uranium.

Uranium loading capacity of the grafted adsorbents was tested by gradually increasing the volume of doped seawater from 10 mL to 100 mL.

Figure 16:
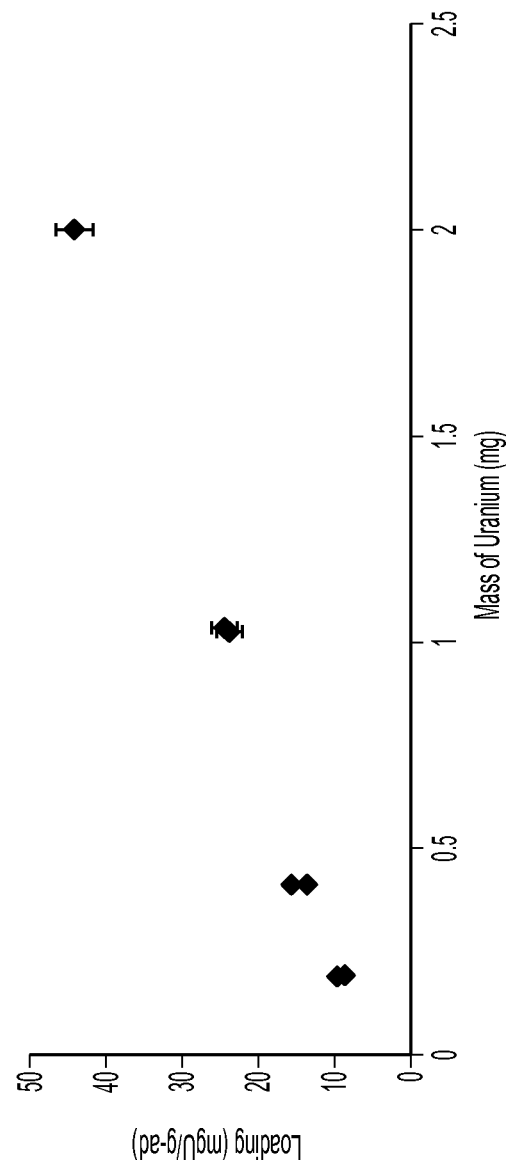
FIG. 16 is a graphical plot showing the increase in loading capacity versus the mass of uranium according to one exemplary embodiment of the present disclosure.

FIG. 16 illustrates the increase in loading capacity (mg U/g-ad) (vertical axis) with loadings of up to 44 mg U/g-adsorbent obtained (4.4%). versus the mass of uranium (mg) (horizontal axis).

An important feature of the Winged nylon adsorbents grafted with B2MP was the finding that the uranium could be partially removed from the adsorbent using acid solutions, resulting in partial regeneration of the polymeric adsorbent for further uptake of uranium. Adsorbent regeneration has far-reaching implications to its performance under service conditions because successful regeneration greatly enhances the economic feasibility of the process.

Regeneration of the grafted samples following adsorption of uranium was studied using several eluents, including HCl, nitric acid, citric acid, ammonium oxalate, oxalic acid and ethylenediamine. All eluents showed a decrease in adsorption capacity following the first cycle of elution, indicating damage to the eluted adsorbent. Ammonium oxalate was by far the most effective, followed by HCl. Citric acid, ethylenediamine and nitric acid were the least effective.

Unlike the other reagents, ammonium oxalate did not reveal a decrease in performance after the first cycle of regeneration, with distribution coefficients remaining consistent after 15 cycles of re-use.

Figure 17:
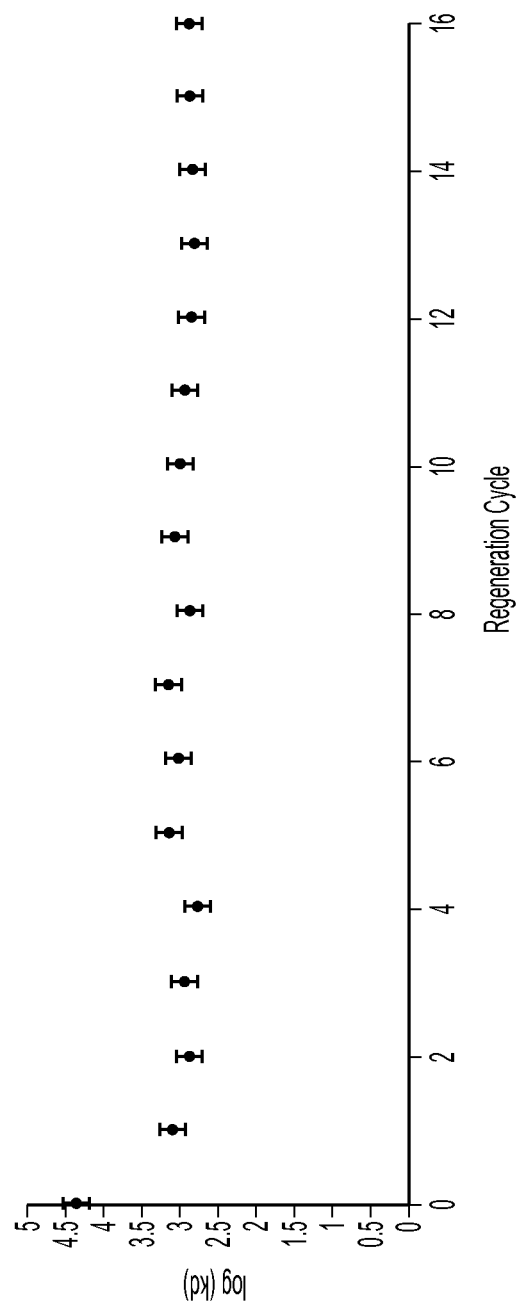
FIG. 17 is a graphical plot showing the change in distribution coefficient $K_d$, represented by the log ($K_d$) upon consecutive cycles of elution/regeneration followed by uranium adsorption tests according to one exemplary embodiment of the present disclosure.

FIG. 17 illustrates the change in $K_d$, represented by the log ($K_d$) (vertical axis) upon consecutive cycles of elution/regeneration (horizontal axis) followed by uranium adsorption tests. We suggest that ammonium oxalate is much less damaging to the adsorbent because the neutral pH of the adsorbent solution does not cause hydrolytic cleavage of the bond between the complexing moiety and the polymeric substrate.

We have demonstrated that effective adsorbents for uranium from seawater can be fabricated through radiation-induced grafting of phosphate-containing monomers onto ultra-high surface area Winged fibers. Uranium loadings of up to 4.4% and distribution coefficients on the order of $10^4$ mL/g have been obtained with grafted adsorbents after contact with real seawater doped with uranium. Adsorbents regenerated with ammonium oxalate have shown at least sixteen cycles of reusability with negligible degeneration of adsorptive capacity after the first cycle. Ultimately, a simple, effective and environmentally-conscious procedure has been developed with the goal of producing a cost-effective and practical adsorbent as an alternative to conventional uranium mining.

Thus, the distribution coefficients, $K_d$, for adsorption of uranium from seawater using Nylon grafted with diethyl allyl phosphonate, vinylphosphonic acid, dimethylvinylphosphonate, and diethylvinylphosphonate are found to have values of 117, 168, 185, and 354 mL·g$^{-1}$, respectively. The molecule of each one of these phosphonates or phosphonic acid has one double carbon-carbon bond. On the other hand, according to the present disclosure Nylon grafted with bis(2-methacryloxyethyl)phosphonate monomer provides a distribution coefficient of 63300 mL·g$^{-1}$. Thus, a major aspect of the present disclosure is that the use of a monomer molecule with at least two C=C bonds in addition to a phosphonate or phosphonic acid functionality, such as bis(2-methacryloxyethyl)phosphonate, provides a very high distribution coefficient for uranium present in a saline medium such as seawater.

The process does not require a chemical post-treatment, unlike the amidoxime process which requires treatment with hydroxylamine following the radiation-induced grafting.

In addition to having high capacity, high selectivity and high rate of reaction for the adsorption of uranium, an effective adsorbent for uranium must have a high surface area available for attaching the reactive molecules and for contact with the seawater. In addition, it is desirable to use for the purpose of the present disclosure polymers that exhibit a high degree of softness and flexibility, a high mechanical strength, and enhanced wicking and total absorption of liquids.

The radiation grafting can be performed under a variety of conditions. Variables include, for example, the type of ionizing radiation, total radiation dose, dose rate, temperature, solvent and pre- and post-treatment that can be readily adjusted and controlled by a person practiced in the art. Radiation sources may include electron beam and ion accelerators, x-ray and UV sources. In one embodiment, the radiation sources are gamma sources, most preferably Co-60 or Cs-137 sources. The total dose is between 0.1 and 1000 kGy, preferably 1 to 200 kGy and most preferably 3 to 100 kGy. The dose rate is 0.01 to 100 kGy/hr, preferably 0.1 to 50 kGy/hr, most preferably 1 to 20 kGy/hr. The temperature is −100 to 50° C., preferably 5 to 40° C. during both irradiation and grafting. The solvent is an organic liquid or an aqueous medium, preferably water. The use of water as a solvent is environmentally advantageous.

The polymer can be a polyolefin, such as polyethylene or polypropylene, polyester or polyamide; most preferably Nylon 6,6. The polymeric fiber has a high surface to volume ratio, preferably a winged fiber. The surface area is above 0.1 m$^2$/g, preferably above 1 m$^2$/g, most preferably between 5 and 50 m$^2$/g.

Thus, in view of the foregoing description and experimental results, the embodiments of the present disclosure relate to a new composition of matter, which is the product by a process of radiation grafting of an organic phosphate onto a polymer. The embodiments of the present disclosure relate also to a method of using such a composition of matter to extract uranium from aqueous environments, in particular seawater.

More particularly, the composition of matter in the form of an adsorbent material is produced by radiation grafting of an organic phosphate with a C=C bond or an organic phosphonate with a C=C bond, preferably with more than one such bond, most preferably bis(2-methacryloxyethyl) phosphate, onto a polymer, preferably a Winged polymer, most preferably Winged nylon 6. The grafting is performed by using a source of ionizing radiation, preferably a gamma source, with a total radiation dose of 0.2-50 kGy, preferably 1-10 kGy. The radiation grafting may be performed either indirectly, with the polymer first irradiated in the absence of oxygen and then contacted with an oxygen-free solution of the organic phosphate or organic phosphonate, respectively, or, preferably, directly, with the polymer irradiated while immersed in an oxygen-free solution of the organic phosphate or organic phosphonate. The solution is preferably aqueous and it may contain other ingredients such as surfactants or polar organic liquids. The degree of radiation grafting, defined as the weight gain of the polymer upon grafting and drying relative to its original weight, is between 25% and 250%, preferably between 50% and 200%, most preferably between 80% and 150%. Preferably the polymer is sonicated following radiation grafting to remove homopolymerized material.

When the new composition of matter, consisting of the grafted polymer, is contacted with an aqueous medium, in particular seawater, which contains uranium, which may be in the form of dissolved uranium, the new composition of matter is effective in removing a substantial amount of uranium, at least 0.1%, preferably at least 1%, most preferably at least 5%, relative to the dry weight of the polymer, from the aqueous medium. Regeneration of the adsorbent through desorption of the uranium can be effected using an aqueous solution, preferably a near-neutral solution of a complexing reagent, most preferably an aqueous solution of ammonium oxalate, to remove the uranium from the phosphate-grafted polymer.

Although the present disclosure has been described in considerable detail with reference to certain preferred version thereof, other versions are possible and contemplated. Therefore, the spirit and scope of the appended claims should not be limited to the description of the preferred versions contained therein.

Any element in a claim that does not explicitly state "means for" performing a specified function or "step for" performing a specified function, is not to be interpreted as a "means" or "step" clause as specified in 35 U.S.C. § 112, ¶6. In particular, the use of "step of" in the claims is not intended to invoke the provisions of 35 U.S.C. § 112, ¶6.

What is claimed is:

1. An adsorbent material prepared by a process of radiation grafting by using a source of ionizing radiation to graft bis(2-methacryloxyethyl) phosphate onto a polymeric fiber, while the polymeric fiber is immersed in an oxygen-free solution of the phosphate, wherein the polymeric fiber has a surface area of at least 10 m$^2$/gram.

2. The adsorbent material according to claim 1, wherein the radiation grafting bis(2-methacryloxyethyl) phosphate onto a polymeric fiber having a surface area of at least 10 m$^2$/gram is performed by radiation grafting bis(2-methacryloxyethyl) phosphate onto polycaproamide.

3. The adsorbent material according to claim 1, wherein the source of ionizing radiation is a gamma source providing a total radiation dose of 0.2-50 kGy to effect the grafting.

4. The adsorbent material according to claim 3, wherein the gamma source provides a total radiation dose of 1-10 kGy to effect the grafting.

5. The adsorbent material according to claim 1, wherein the polymeric fiber is irradiated while immersed in an oxygen-free solution containing components selected from the group consisting of surfactants, polar organic liquids, and combinations thereof.

6. The adsorbent material according to claim 1, wherein the radiation grafting is characterized by a degree of grafting, defined as the weight gain of the polymeric fiber upon grafting and drying relative to its original weight, that is between 25% and 250%.

7. The adsorbent material according to claim 6, wherein the degree of radiation grafting is between 50% and 200%.

8. The adsorbent material according to claim 7, wherein the degree of radiation grafting is between 80% and 150%.

9. The adsorbent material according to claim 1, wherein the polymer is sonicated following radiation grafting to remove homopolymerized material.

10. An adsorbent material prepared by a process of radiation grafting by using a source of ionizing radiation to graft bis(2-methacryloxyethyl) phosphate onto a polymer while the polymer is immersed in an oxygen-free solution of the phosphate, wherein the adsorbent material, consisting of the grafted polymer, is contacted with the aqueous solution, wherein the aqueous solution includes uranium, and the adsorbent material removes an amount of uranium, at least 0.1%, relative to the dry weight of the polymer, from the aqueous solution.

11. The adsorbent material according to claim 10, wherein the adsorbent material is regenerated through desorption of the uranium using an aqueous solution to remove the uranium from the phosphate-grafted polymer.

12. The adsorbent material according to claim 11, wherein the adsorbent material is regenerated through desorption of the uranium using a near-neutral solution of a complexing reagent to remove the uranium from the phosphate-grafted polymer.

13. The adsorbent material according to claim 12, wherein the adsorbent material is regenerated through desorption of the uranium using a near-neutral solution of a complexing reagent that is an aqueous solution of ammonium oxalate to remove the uranium from the phosphate-grafted polymer.

14. A method of removing uranium from an aqueous solution comprising the steps of:
providing an adsorbent material produced by using a source of ionizing radiation to graft bis(2-methacryloxyethyl) phosphate onto a polymer; and
contacting the grafted polymer with the aqueous solution that includes uranium such that the adsorbent material removes an amount of uranium, at least 0.1%, relative to the dry weight of the polymer, from the aqueous solution.

15. The method of removing uranium from an aqueous solution according to claim 14, wherein the radiation grafting of bis(2-methacryloxyethyl) phosphate onto the polymer is performed by radiation grafting bis(2-methacryloxyethyl) phosphate onto a polymeric fiber having a surface area of at least 10 $m^2$/gram.

16. The method of removing uranium from an aqueous solution according to claim 15, wherein the radiation grafting bis(2-methacryloxyethyl) phosphate onto the polymeric fiber having a surface area of at least 10 $m^2$/gram is performed by radiation grafting bis(2-methacryloxyethyl) phosphate onto polycaproamide.

17. The method of removing uranium from an aqueous solution according to claim 14, wherein the source of ionizing radiation is a gamma source providing a total radiation dose of 0.2-50 kGy to effect the radiation grafting.

18. The method of removing uranium from an aqueous solution according to claim 17, wherein the gamma source provides a total radiation dose of 1-10 kGy to effect the radiation grafting.

19. The method of removing uranium from an aqueous solution according to claim 14, wherein the step of contacting the grafted polymer with the aqueous solution includes contacting the grafted polymer with a solution containing components selected from the group consisting of surfactants, polar organic liquids, and combinations thereof.

20. The method of removing uranium from an aqueous solution according to claim 14, wherein the radiation grafting is characterized by a degree of grafting, defined as the weight gain of the polymer upon grafting and drying relative to its original weight, that is between 25% and 250%.

21. The method of removing uranium from an aqueous solution according to claim 20, wherein the degree of radiation grafting is between 50% and 200%.

22. The method of removing uranium from an aqueous solution according to claim 21, wherein the degree of radiation grafting is between 80% and 150%.

23. The method of removing uranium from an aqueous solution according to claim 14, wherein the polymer is sonicated following radiation grafting to remove homopolymerized material.

24. The method of removing uranium from an aqueous solution according to claim 14, wherein the adsorbent material is regenerated through desorption of the uranium using an aqueous solution to remove the uranium from the phosphate-grafted polymer.

25. The method of removing uranium from an aqueous solution according to claim 24, wherein the adsorbent material is regenerated through desorption of the uranium using a near-neutral solution of a complexing reagent to remove the uranium from the phosphate-grafted polymer.

26. The method of removing uranium from an aqueous solution according to claim 25, wherein the adsorbent material is regenerated through desorption of the uranium using a near-neutral solution of a complexing reagent that is an aqueous solution of ammonium oxalate to remove the uranium from the phosphate-grafted polymer.

27. An adsorbent material for removing uranium from an aqueous solution
wherein the adsorbent material is prepared by a process of radiation grafting by using a source of ionizing radiation to graft bis(2-methacryloxyethyl) phosphate onto a polymer, while the polymer is immersed in an oxygen-free solution of the organic phosphate;
contacting the grafted polymer with the aqueous solution that includes uranium such that the adsorbent material removes an amount of uranium, at least 0.1%, relative to the dry weight of the polymer, from the aqueous solution; and
regenerating the adsorbent material at least once through desorption of the uranium using a near-neutral solution of a complexing reagent that is an aqueous solution of ammonium oxalate to remove the uranium from the phosphate-grafted polymer.

28. The adsorbent material according to claim 27, wherein the adsorbent material for removing uranium from an aqueous solution is an adsorbent material for removing uranium from an aqueous solution of one of brine or seawater.

29. The adsorbent material according to claim 27, wherein the radiation grafting of bis(2-methacryloxyethyl) phosphate onto the polymer is performed by radiation grafting bis(2-methacryloxyethyl) phosphate onto a polymeric fiber having a surface area of at least 10 $m^2$/gram.

30. The adsorbent material according to claim 29, wherein the radiation grafting bis(2-methacryloxyethyl) phosphate onto a polymeric fiber having a surface area of at least 10 $m^2$/gram is performed by radiation grafting bis(2-methacryloxyethyl) phosphate onto polycaproamide.

31. The adsorbent material according to claim 27, wherein the source of ionizing radiation is a gamma source providing a total radiation dose of 0.2-50 kGy to effect the grafting.

32. The adsorbent material according to claim 31, wherein the gamma source provides a total radiation dose of 1-10 kGy to effect the grafting.

33. The adsorbent material according to claim 27, wherein the radiation grafting is performed with the polymer first irradiated in the absence of oxygen and then contacted with an oxygen-free solution of the organic phosphate.

34. The adsorbent material according to claim 27, wherein the radiation grafting is performed with the polymer irradiated while immersed in an oxygen-free solution of the organic phosphate.

35. The adsorbent material according to claim 27, wherein the polymer is irradiated while immersed in an oxygen-free solution containing components selected from the group consisting of surfactants, polar organic liquids, and combinations thereof.

36. The adsorbent material according to claim 27, wherein the radiation grafting is characterized by a degree of grafting, defined as the weight gain of the polymer upon grafting and drying relative to its original weight, that is between 25% and 250%.

37. The adsorbent material according to claim 36, wherein the degree of radiation grafting is between 50% and 200%.

38. The adsorbent material according to claim 37, wherein the degree of radiation grafting is between 80% and 150%.

39. The adsorbent material according to claim 27, wherein the polymer is sonicated following radiation grafting to remove homopolymerized material.

40. A method of removing uranium from an aqueous solution comprising the steps of:
providing an adsorbent material produced by using a source of ionizing radiation to graft bis(2-methacryloxyethyl) phosphate onto a polymer;
contacting the grafted polymer with the aqueous solution that includes uranium such that the adsorbent material removes an amount of uranium, at least 0.1%, relative to the dry weight of the polymer, from the aqueous solution; and
regenerating the adsorbent material at least once through desorption of the uranium using a near-neutral solution of a complexing reagent that is an aqueous solution of ammonium oxalate to remove the uranium from the phosphate-grafted polymer.

41. The method of removing uranium from an aqueous solution according to claim 40, wherein the adsorbent material removes uranium from an aqueous solution that is one of brine or seawater.

42. The method of removing uranium from an aqueous solution according to claim 40, wherein, following adsorption of uranium from the aqueous solution followed by regeneration with an aqueous solution of ammonium oxalate, the distribution coefficient of the regenerated adsorbent material is greater than 250.

43. The method of removing uranium from an aqueous solution according to claim 42, wherein the distribution coefficient of the regenerated adsorbent material is greater than 500.

44. The method of removing uranium from an aqueous solution according to claim 40, wherein, following at least 15 cycles of adsorption of uranium from the aqueous solution followed by regeneration with an aqueous solution of ammonium oxalate, the distribution coefficient of the regenerated adsorbent material is greater than 250.

45. The method of removing uranium from an aqueous solution according to claim 44, wherein the distribution coefficient of the regenerated adsorbent material is greater than 500.

46. The method of removing uranium from an aqueous solution according to claim 41, wherein, following at least 15 cycles of adsorption of uranium from the brine or seawater followed by regeneration with an aqueous solution of ammonium oxalate, the distribution coefficient of the regenerated adsorbent material is greater than 250.

47. The method of removing uranium from an aqueous solution according to claim 46, wherein the distribution coefficient of the regenerated adsorbent material is greater than 500.

48. The method of removing uranium from an aqueous solution according to claim 41, wherein, following at least 15 cycles of adsorption of uranium from the brine or seawater followed by regeneration with an aqueous solution of ammonium oxalate, the distribution coefficient of the regenerated adsorbent material is greater than 250.

49. The method of removing uranium from an aqueous solution according to claim 48, wherein the distribution coefficient of the regenerated adsorbent material is greater than 500.

50. The method of removing uranium from an aqueous solution according to claim 40, wherein the radiation grafting of bis(2-methacryloxyethyl) phosphate onto the polymer is performed by radiation grafting bis(2-methacryloxyethyl) phosphate onto a polymeric fiber having a surface area of at least 10 $m^2$/gram.

51. The method of removing uranium from an aqueous solution according to claim 50, wherein the radiation grafting bis(2-methacryloxyethyl) phosphate onto the polymeric fiber having a surface area of at least 10 $m^2$/gram is performed by radiation grafting bis(2-methacryloxyethyl) phosphate onto polycaproamide.

52. The method of removing uranium from an aqueous solution according to claim 40, wherein the source of ionizing radiation is a gamma source providing a total radiation dose of 0.2-50 kGy to effect the radiation grafting.

53. The method of removing uranium from an aqueous solution according to claim 52, wherein the gamma source provides a total radiation dose of 1-10 kGy to effect the radiation grafting.

54. The method of removing uranium from an aqueous solution according to claim 40, wherein the radiation grafting is performed with the polymer first irradiated in the absence of oxygen and then contacted with an oxygen-free solution of the organic phosphate.

55. The method of removing dissolved uranium from an aqueous solution according to claim 40, wherein the radiation grafting is performed with the polymer irradiated while immersed in an oxygen-free solution of the organic phosphate.

56. The method of removing uranium from an aqueous solution according to claim 40, wherein the step of contacting the grafted polymer with the aqueous solution includes contacting the grafted polymer with a solution containing components selected from the group consisting of surfactants, polar organic liquids, and combinations thereof.

57. The method of removing uranium from an aqueous solution according to claim 40, wherein the radiation grafting is characterized by a degree of grafting, defined as the weight gain of the polymer upon grafting and drying relative to its original weight, that is between 25% and 250%.

58. The method of removing uranium from an aqueous solution according to claim 57, wherein the degree of radiation grafting is between 50% and 200%.

59. The method of removing uranium from an aqueous solution according to claim 58, wherein the degree of radiation grafting is between 80% and 150%.

60. The method of removing uranium from an aqueous solution according to claim 40, wherein the polymer is sonicated following radiation grafting to remove homopolymerized material.

* * * * *